US011856596B2

(12) United States Patent
Garcia-Luna-Aceves et al.

(10) Patent No.: US 11,856,596 B2
(45) Date of Patent: *Dec. 26, 2023

(54) TECHNIQUES FOR PERIODIC TRANSMISSION OF COMMUNICATIONS PACKETS

(71) Applicant: The Regents of the University of California, Oakland, CA (US)

(72) Inventors: Jose Joaquin Garcia-Luna-Aceves, Santa Cruz, CA (US); Luca de Alfaro, Santa Cruz, CA (US); Molly Zhang, Santa Cruz, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/931,140

(22) Filed: Sep. 12, 2022

(65) Prior Publication Data

US 2023/0007671 A1 Jan. 5, 2023

Related U.S. Application Data

(63) Continuation of application No. 16/951,770, filed on Nov. 18, 2020, now Pat. No. 11,464,031.

(Continued)

(51) Int. Cl.
*H04W 72/50* (2023.01)
*H04W 72/0446* (2023.01)
(Continued)

(52) U.S. Cl.
CPC ........... *H04W 72/535* (2023.01); *H04L 47/20* (2013.01); *H04W 72/0446* (2013.01); *H04W 74/0816* (2013.01)

(58) Field of Classification Search
None
See application file for complete search history.

(56) References Cited

U.S. PATENT DOCUMENTS

2010/0208666 A1 8/2010 Frederiksen et al.
2017/0048869 A1 2/2017 Chmiel et al.
(Continued)

OTHER PUBLICATIONS

Van Vinh, Phan, Optimized Sharable-Slot Allocation Using Multiple Channels to Reduce Data-Gathering Delay in Wireless Sensor Networks, 2016, Sensors (Year: 2016).

*Primary Examiner* — Jason E Mattis
*Assistant Examiner* — Bao G Nguyen
(74) *Attorney, Agent, or Firm* — Wolter Van Dyke Davis, PLLC; Eugene J. Molinelli

(57) ABSTRACT

Techniques include retrieving from storage a plurality of policies for sharing a shared channel among nodes in a data communications network. The plurality of polices define a tree of periodic schedules of variable periods, each policy defines a transmit time slot as a unique slot i of a modulus of a power m of a base b of a series of time slots, where m indicates a level of the tree of periodic schedules. The method also includes; observing at a first node the probabilities of empty time slots, successful time slots, and collision time slots on the shared channel; selecting at the first node a first policy among the plurality of policies based on the probabilities observed instead of a message received from a central authority; and transmitting a local data packet from the first node onto the shared channel at a transmit time based on the first policy.

20 Claims, 20 Drawing Sheets

Related U.S. Application Data

(60) Provisional application No. 62/937,001, filed on Nov. 18, 2019.

(51) Int. Cl.
*H04W 74/08* (2009.01)
*H04L 47/20* (2022.01)

(56) References Cited

U.S. PATENT DOCUMENTS

| | | |
|---|---|---|
| 2019/0273530 A1* | 9/2019 | Kumar ................ H04L 27/2655 |
| 2020/0252949 A1 | 8/2020 | Kim et al. |
| 2021/0153226 A1* | 5/2021 | Garcia-Luna-Aceves ................... H04W 74/0816 |

\* cited by examiner

FIG. 4

Constants:
1. $\alpha_k = 0.98$: kindness inertia;
2. $\alpha_b = 0.99$: barge-in inertia;
3. $q_k = 10^{-2}$: kindness probability lower bound;
4. $q_b = 10^{-3}$: barge-in probability lower bound;
5. $\kappa = 0.05$: target fraction of empty slots;
6. $e$: base of natural logarithm;
7. $M = 10$: maximum number of schedules in a policy;
8. $\Delta = 4$: maximum schedule level difference;
9. $\Delta_{new} = 2$: schedule insertion delta;

State Variables:
10. $active$: True if the node is active; false otherwise;
11. $t$: time slot counter;
12. $\pi$: APT policy;
13. $p_b, p_k$: burst-in and kindness probabilities;

Channel Variables:
14. $T$: transmit; $W$: wait;
15. $d \in \{T, W\}$: decision;
16. $S$: successful time slot;
17. $E$: empty time slot;
18. $C$: time slot with collisions;
19. $c \in \{S, E, C\}$: channel state;

Initialization:
20. $t := 0; p_b := 0.1; p_k := 0.05;$
21. $\pi := choice\{(0,1),(1,1)\};$

At every time slot:
22. $t := t + 1;$
23. // Decision and outcome
24. if $t \in T(\pi)$ and $active$ then $d := T$ else $d := W$;
25. $h := channel\ outcome\ in\ \{E, C, S\};$
26. // Policy update
27. if $d = T$ then
28.    if $h = S$ then
29.       with probability $p_k$:
30.          $\pi := demote(\pi, t)$
31.    if $h = C$ then $\pi := demote(\pi, t);$
32. if $d = W$ and $h = E$ then
33.    with probability $p_b$:
34.       $\pi = bargein(\pi, t, \Delta_{new})$
35. $\pi := normalize(\pi, M, \Delta);$
36. // Probability update
37. if $h = E$ then $p_k := p_k \cdot \alpha_k^{1/\kappa}$ else $p_k := p_k/\alpha_k$;
38. if $h = E$ then $p_b := p_b/\alpha_b$;
39. if $h = C$ then $p_b := p_b \cdot \alpha_b + b^{1/(e-2)};$
40. $p_k := \min(0.5, \max(q_k, p_k)); p_b := \min(0.5, \max(q_b, p_b))$

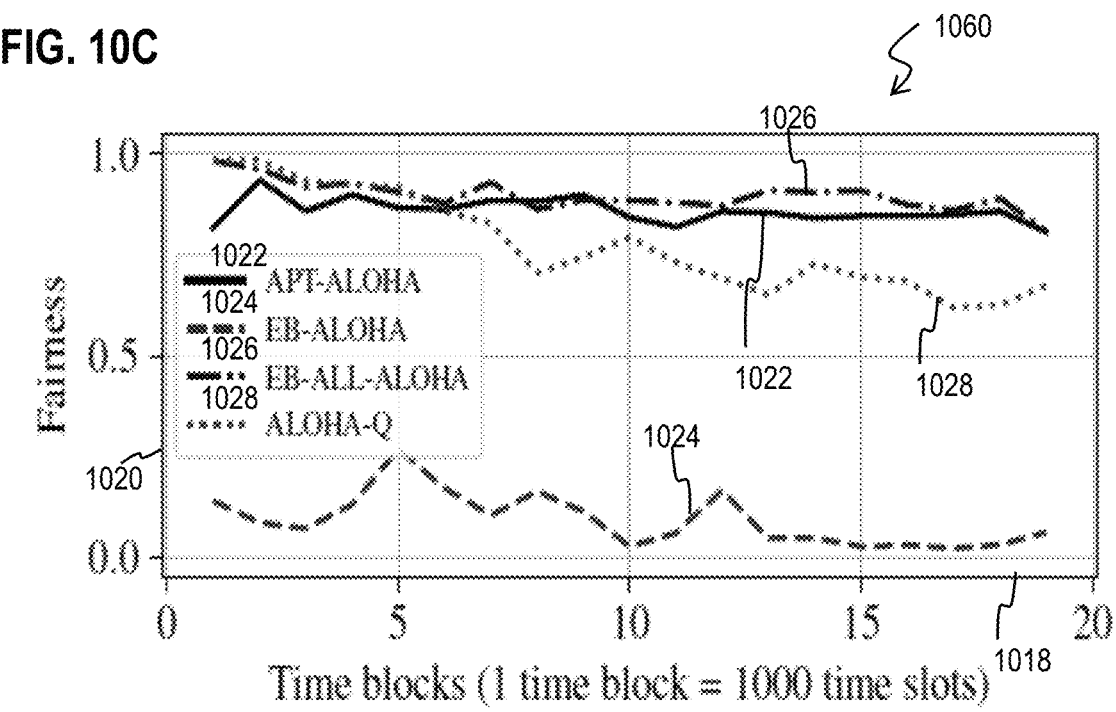

TECHNIQUES FOR PERIODIC TRANSMISSION OF COMMUNICATIONS PACKETS

CROSS REFERENCE TO RELATED APPLICATIONS

This application claims benefit as a Continuation under 35 U.S.C. § 120 of U.S. patent application Ser. No. 16/951,770, filed Nov. 18, 2020, which claims benefit under 35 U.S.C. § 119(e) of U.S. Provisional Application No. 62/937,001 filed Nov. 18, 2019.

BACKGROUND

Networks of general-purpose computer systems connected by external communication links are well known and widely used in commerce. The networks often include one or more network devices that facilitate the passage of information between the computer systems. A network node is a network device or computer system connected by the communication links. An end node is a node that is configured to originate or terminate communications over the network. An intermediate network node facilitates the passage of data between end nodes.

Communications between nodes are typically affected by exchanging discrete packets of data. Information is exchanged within data packets according to one or more of many well-known, new or still developing protocols. In this context, a protocol consists of a set of rules defining how the nodes interact with each other based on information sent over the communication links. Each packet typically comprises 1] header information associated with a particular protocol, and 2] payload information that follows the header information and contains information that may be processed independently of that particular protocol. In some protocols, the packet includes 3] trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different layer of detail for information exchange. The header for a particular protocol typically indicates a type for the next protocol contained in its payload. The higher layer protocol is said to be encapsulated in the lower layer protocol.

The headers included in a packet traversing multiple heterogeneous networks, such as the Internet, typically include a physical (layer 1) header, a data-link (layer 2) header, an internetwork (layer 3) header and a transport (layer 4) header, as defined by the Open Systems Interconnection (OSI) Reference Model. The OSI Reference Model is generally described in more detail in Section 1.1 of the reference book entitled Interconnections Second Edition, by Radia Perlman, published September 1999, which is hereby incorporated by reference as though fully set forth herein.

In Layer 2 of a network, the Media Access Control (MAC) sublayer provides addressing and channel access control mechanisms that enable several terminals or network nodes to communicate in a network.

Some protocols pass protocol-related information among two or more network nodes in special control packets that are communicated separately; and, which include a payload of information used by the protocol itself rather than a payload of data to be communicated for another application. These control packets and the processes at network nodes that utilize the control packets are said to be in another dimension, a "control plane," distinct from the "data plane" dimension that includes the data packets with payloads for other applications at the end nodes.

In most wireless ad-hoc networks, the nodes compete for access to a shared wireless medium, often resulting in collisions (interference). Many ad-hoc network nodes use half duplex transceivers, which use the same radio channel for transmitting and receiving. Such half duplex nodes cannot receive while transmitting. Thus, it is possible, and even common, due to collisions for such nodes to miss the control plane messages and headers that are designed to control the flow of packets.

Carrier-sense multiple access (CSMA) is arguably the most widely used technique for the sharing of common radio channels in ad-hoc networks today, as it is an integral part of the IEEE 802.11 protocol standard. According to CSMA, a transmitter will not transmit while a channel is active, as determined by sensing the carrier radio frequency. This traditional collision avoidance handshake consists of a request-to-send (RTS) message in one or more data packets, a clear-to-send (CTS) message in one or more data packets, a variable length data message in one or more data packets, and an acknowledgment (ACK) message in one or more data packets. However, CSMA is not always suitable.

SUMMARY

It is recognized here that, in some circumstances, carrier sensing is either not possible or becomes too onerous. Examples of such circumstances are untethered networks with long propagation delays (e.g., underwater sensor networks, satellite networks and space networks), wireless networks that operate in noisy environments, or terrains in which hidden-terminal interference is prevalent, and Internet of Things (IoT) deployments consisting of very simple nodes, such as wireless sensors. These different circumstances, among others, are grouped under the term reduced radio capacity.

Techniques are provided for increasing utilization of a channel while reducing collisions thus improving performance when sharing common radio channels in ad-hoc networks at nodes by selecting from a tree a periodic schedule of variable period in which to transmit communications packets.

In a first set of embodiments, a method includes retrieving from storage a plurality of policies for sharing a shared channel among nodes in a data communications network using a particular protocol. The plurality of polices define a tree of periodic schedules of variable periods, each policy defines a transmit time slot as a unique slot i of a modulus of a power m of a base b of a series of time slots, where m indicates a level of the tree of periodic schedules. The method also includes observing at a first node the probabilities of empty time slots and successful time slots and collision time slots on the shared channel. The method further includes selecting at the first node in the data communications network a first policy among the plurality of policies based on the probabilities observed instead of a message received from a central authority. The method still further includes transmitting a local data packet from the first node onto the shared channel at a transmit time based on the first policy.

In other sets of embodiments, an apparatus or system or computer-readable medium is configured to perform one or more steps of one or more of the above methods.

Still other aspects, features, and advantages are readily apparent from the following detailed description, simply by illustrating a number of particular embodiments and implementations, including the best mode contemplated for carrying out the invention. Other embodiments are also capable of other and different features and advantages, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

Embodiments are illustrated by way of example, and not by way of limitation, in the figures of the accompanying drawings in which like reference numerals refer to similar elements and in which:

FIG. 4 is a chart that illustrates an example of an algorithm with a set of instructions for performing one or more steps of the method of FIG. 2, according to an embodiment;

FIGS. 10A through 10C are graphs that illustrate example traces that compare network utilization and fairness of the method of FIG. 2 with conventional methods where the number of active nodes continuously increases, according to an embodiment;

DETAILED DESCRIPTION

Techniques are described for avoiding packet collisions on a shared communications channel under conditions of reduced radio capacity by using virtual time slotting or shared congestion information or some combination. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Notwithstanding that the numerical ranges and parameters setting forth the broad scope are approximations, the numerical values set forth in specific non-limiting examples are reported as precisely as possible. Any numerical value, however, inherently contains certain errors necessarily resulting from the standard deviation found in their respective testing measurements at the time of this writing. Furthermore, unless otherwise clear from the context, a numerical value presented herein has an implied precision given by the least significant digit. Thus, a value 1.1 implies a value from 1.05 to 1.15. The term "about" is used to indicate a broader range centered on the given value, and unless otherwise clear from the context implies a broader range around the least significant digit, such as "about 1.1" implies a range from 1.0 to 1.2. If the least significant digit is unclear, then the term "about" implies a factor of two, e.g., "about X" implies a value in the range from 0.5× to 2×, for example, about 100 implies a value in a range from 50 to 200. Moreover, all ranges disclosed herein are to be understood to encompass any and all sub-ranges subsumed therein, such as subranges to avoid any prior art. For example, a range of "less than 10" for a positive only parameter can include any and all sub-ranges between (and including) the minimum value of zero and the maximum value of 10, that is, any and all sub-ranges having a minimum value of equal to or greater than zero and a maximum value of equal to or less than 10, e.g., 1 to 4.

Some embodiments of the invention are described below in the context of enhancing an ALOHA protocol with a plurality of policies defining a tree of periodic schedules of variable periods based on modulus of a power m of a base b where b=2. However, the invention is not limited to this context. In other embodiments, methods disclosed within apply to any protocol for sharing of common radio channels in ad-hoc networks using policies having any base b.

1. Overview

Figure 1:
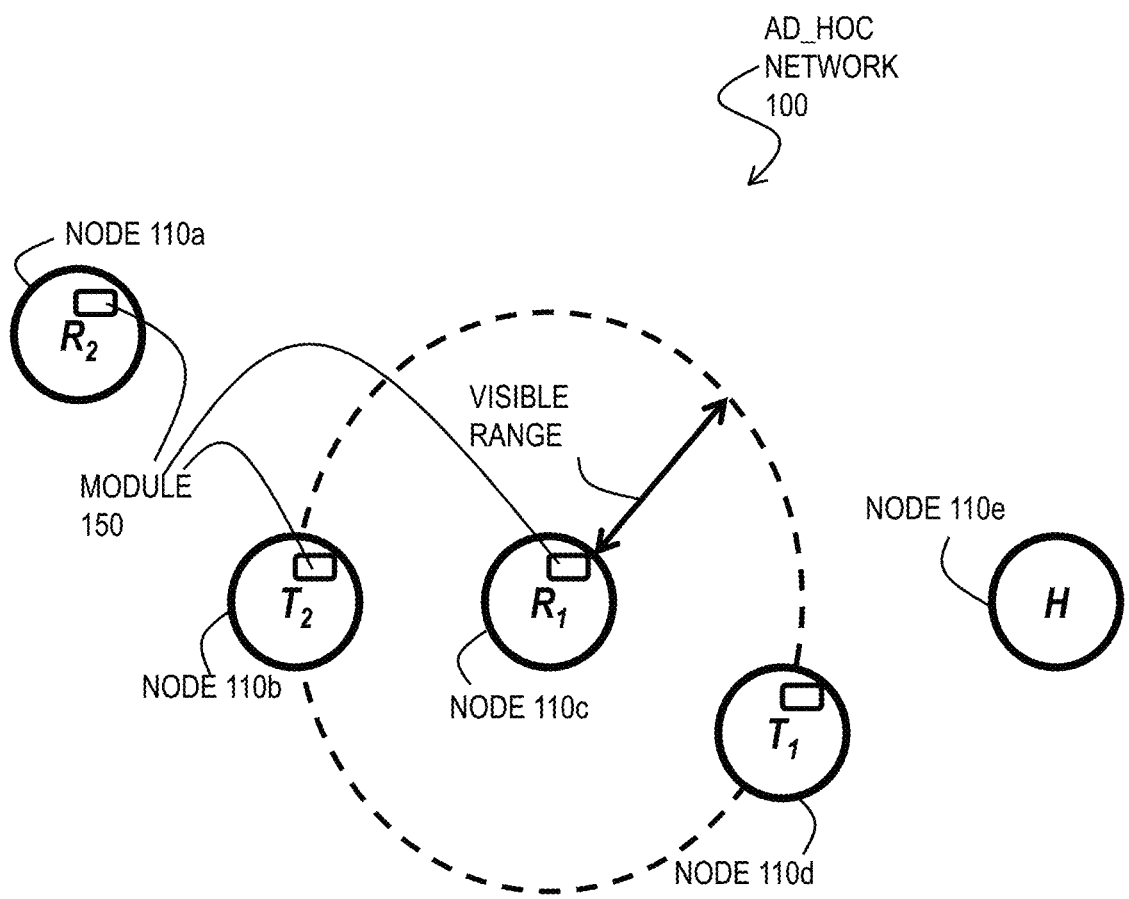
FIG. 1 is a block diagram that illustrates example nodes in an ad-hoc network, according to an embodiment.

FIG. 1 is a block diagram that illustrates example nodes 110a, 110b, 110c, 110d, 110e, (collectively referenced hereinafter as nodes 110) in an ad-hoc network 100, according to an embodiment. In an ad hoc network the relative positions of nodes are not fixed, and the nodes can move in and out of range freely, e.g., the nodes are untethered. In the illustrated embodiment, each node 110 is in communication with one or two adjacent nodes that are within a visible range; but non-adjacent nodes are outside the visible range and are thus "hidden." The nodes 110 constitute an ad-hoc network 100 in which data packets can hop, e.g., from node 110a to node 110b to node 110c to node 110d to node 110e and to any node (not shown) sharing a network (not shown) with node 110e. To avoid collisions with data packets from adjacent and hidden nodes while transferring data packets from one node to the next, each of nodes 110a through node 110d includes a module 150 that selects a policy from a plurality of polices defining a tree of periodic schedules of variable periods. In an embodiment, the module 150 is hosted by one or more of the computer system of FIG. 11, the chip set of FIG. 12 and/or the mobile terminal of FIG. 13. In an embodiment, the module 150 includes a memory that stores instructions to perform one or more steps of the method 200 of FIG. 2.

Although processes, equipment, and data structures are depicted in FIG. 1 as integral blocks in a particular arrangement for purposes of illustration, in other embodiments one or more processes or data structures, or portions thereof, are arranged in a different manner, on the same or different hosts, in one or more databases, or are omitted, or one or more different processes or data structures are included on the same or different hosts.

Figure 2:
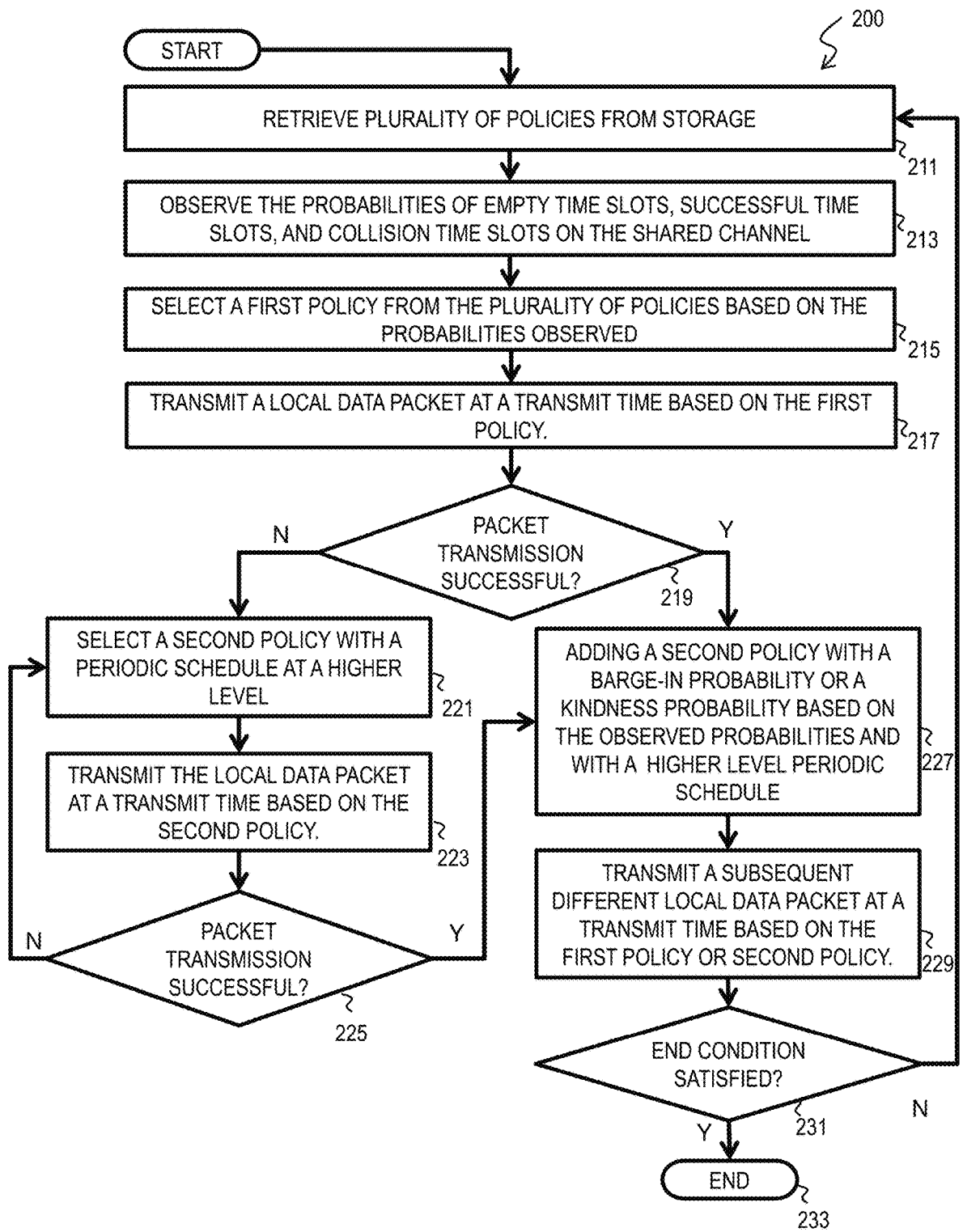
FIG. 2 is a flow chart that illustrates an example method for selecting a policy for transmitting a data packet on a shared channel, according to an embodiment.

FIG. 2 is a flow chart that illustrates an example method for selecting a policy for transmitting a data packet on a shared channel, according to an embodiment. Although steps are depicted in FIG. 2 as integral steps in a particular order for purposes of illustration, in other embodiments, one or more steps, or portions thereof, are performed in a different order, or overlapping in time, in series or in parallel, or are omitted, or one or more additional steps are added, or the method is changed in some combination of ways.

Figure 3A:
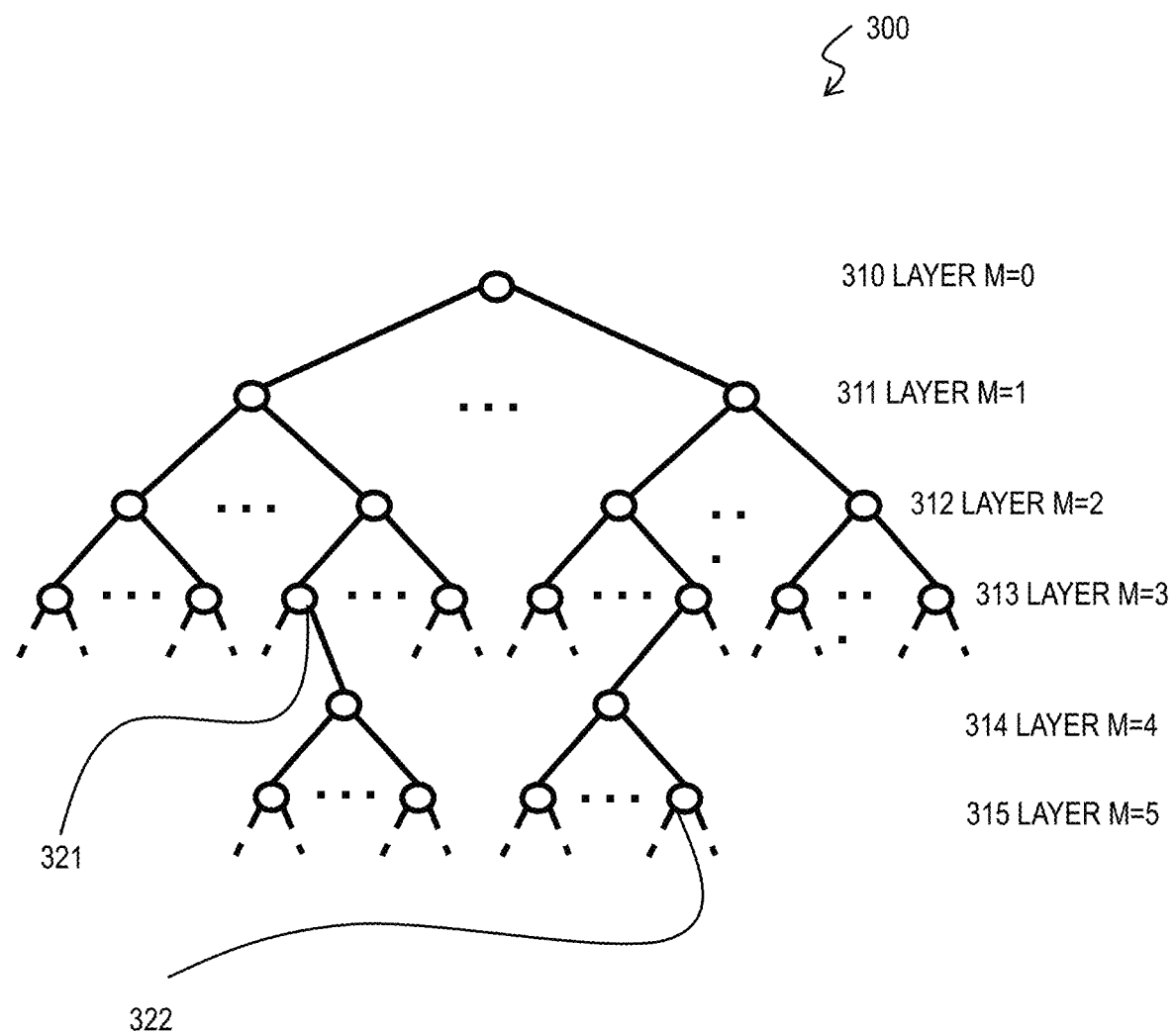
FIG. 3A is a tree chart that illustrates an example schedule tree along with a policy consisting of two schedules, according to an embodiment.

In step 211, a plurality of policies are retrieved from storage. The plurality of policies define a tree of periodic schedules. A periodic schedule (i,m) prescribes sending at all times t such that $t \bmod b^m = i$; where $T(i,m) = \{t | t \bmod b^m = i\}$ is the set of times associated with schedule (i,m). Let $S = \{(i, m) | m > 0, 0 \leq i < b^m\}$ be the set of all periodic schedules. FIG. 3A is a tree with b schedules at each level m.

For purposes of illustration, it is assumed that the base b=2. In this embodiment, a periodic schedule (i,m) prescribes sending at all times t such that $t \bmod 2^m = i$; where $T(i,m) = \{t | t \bmod 2^m = i\}$ is the set of times associated with schedule (i,m). Let $S = \{(i,m) | m > 0, 0 \leq i < 2^m\}$ be the set of all periodic schedules. As will be discussed in further detail in FIG. 3B through FIG. 3H are embodiments of a tree where b=2. The schedules in S can be arranged in a tree, where the schedule (i,m) has (i,m+1) and $(i+2^m, m+1)$ as children. A child schedule transmits in only half the time slots as its parent. Hence, the bandwidth of each schedule decreases by half each level as the tree is traversed from its root.

In step 213, the node observes the shared channel for the probabilities of empty time slots, successful time slots, and collision time slots corresponding to time slots where the channel was empty or a transmission (regardless of which node sent the packet) resulted in a successful transmission or a collision. The probabilities of empty time slots, successful time slots, and collision time slots are associated to each policy in the tree.

In step 213, based on the observed probabilities, the node also determines a barge-in probability and a kindness probability.

In step 215, a first policy is selected based on the observed probabilities associated with empty time slots, successful time slots, and collision time slots. The policy is selected based on the observed probabilities instead of a message received from a central authority as done in prior approaches. In step 217, the system waits for a transmit time based on the first policy and, attempts to transmit a local data packet.

In step 219 it is determined whether the sent packet was successfully transmitted. If the transmission is determined to be unsuccessful then, in step 221, a second policy is selected with a higher m value and then in step 223, the local data packet is transmitted again at a time based on the second policy. That is, when the local data packet is not successfully transmitted, step 221 includes selecting at the first node a different second policy among the plurality of policies, wherein the second policy has a periodic schedule at higher level m of the tree of periodic schedules. In a preferred embodiment, a periodic schedule of the second policy is not a descendant and/or a sibling of a periodic schedule of the first policy in the tree of periodic schedule.

In step 225 it is determined whether the packet sent under the new policy is successful. If not, control passes back to step 221. If so, control passes to step 227, described next.

When, in step 219 or in step 225, the transmission is determined to be successful then, in step 227, a second policy is selected based on the barge-in or kindness probabilities or both. For example, step 227 includes when the local data packet is successfully transmitted, adding at the first node, with a barge-in probability based on at least one of the observed probabilities, a different second policy among the plurality of policies, wherein the second policy has a periodic schedule at higher level m of the tree of periodic schedules. In some of these embodiments, a periodic schedule of the second policy IS NOT a descendant of a periodic schedule of the first policy in the tree of periodic schedules.

In some embodiments, when the local data packet is successfully transmitted, step 227 includes selecting at the first node, with a kindness probability based on at least one of the observed probabilities, a different second policy among the plurality of policies, wherein the second policy has a periodic schedule at higher level m of the tree of periodic schedules. In some of these embodiments, a periodic schedule of the second policy IS a descendant of a periodic schedule of the first policy in the tree of periodic schedules.

In step 229, a different local data packet is transmitted based on at least one of the first policy and the second policy.

If an end condition is satisfied in step 231 then the method ends in step 233. In some embodiments, the end condition may be a set number of attempts or a predetermined time. Otherwise, if the end condition is not met then the system returns to step 211.

FIG. 3A is a tree chart that illustrates an example schedule tree 300 along with a policy consisting of two schedules, according to an embodiment. In an embodiment, each policy has b children indicated by ellipsis. As it may be appreciated by those skilled in the art, the number of children (i.e. the base b) of each schedule is non-limiting and may be represented by any positive integer. The level of a schedule with respect to its parent may be represented by the power m, where the power m indicates a lower position in the tree than power m−1. Example schedule levels are depicted for level 310 (m=0), level 311 (m=1), level 312 (m=2), level 313 (m=3), level 314 (m=4) and level 315 (m=5). Two schedules are selected, indicated by node 321 on level 313 (m=3) and node 322 on level 315 (m=5). The two schedules constitute one policy in the depicted example. Note that node 322 is NOT a descendant of node 321 in tree b 300.

2. Example Embodiments

An example embodiment of the method 200 of FIG. 2 has been implemented using base b=2 and called the APT-ALOHA protocol and is described in more detail herein.

2.1 Example Method

FIG. 4 is a list of example instructions for performing the method of FIG. 2, according to this embodiment. In this embodiment, the set of instructions of the algorithm are provided in the memory of the module 150. The algorithm features line numbers which will be referenced herein. In this embodiment, the algorithm is an Adaptive Policy Tree (APT) algorithm.

In this embodiment, the algorithm sets a value for one or more constants used in the method 200. Lines 1-9 of the algorithm define values for a plurality of constants. These constants include kindness inertia $\alpha_k$; barge-in inertia $\alpha_b$; kindness probability lower bound $q_k$; barge-in probability lower bound $q_b$; target fraction of empty slots $\kappa$; base of natural logarithm e; maximum number of schedules in a policy M; maximum schedule level difference $\Delta$ and schedule insertion delta $\Delta_{new}$. Although FIG. 4 lists initial values for each of these constants, embodiments are not limited to these specific values. Additionally, embodiments are not limited to these specific constants and may include fewer or more constants than listed in FIG. 4.

In the illustrated embodiment, the algorithm defines one or more state variables. Lines 10-13 of the algorithm define example state variables. In this embodiment, line 10 lists a state variable active. The value of variable active indicates one of two states, e.g., TRUE (active) or FALSE (inactive), depending on whether the nodes has packets that need sending. In this embodiment, line 11 lists a time slot counter variable t. Every node 110 has a clock that counts the number of time slots. In this embodiment, the algorithm updates the time-slot counter t, the policy $\pi \in P$ and two probabilities $p_b$ and $p_k$, known as the barge-in and kindness probabilities, respectively. The value of the variables $p_b$ and $p_k$ is in a range from 0 to 1. Embodiments are not limited to these specific state variables and may include fewer or more variables than listed in FIG. 4.

In the illustrated embodiment, the algorithm defines one or more channel variables. Lines 14-19 of the algorithm define example channel variables. In this embodiment, at each time slot a node 110 of the ad hoc network 100 has the choice of either transmitting or waiting. For purposes of this description, this decision is held in variable d with two values denoted by T for transmitting and W for waiting, respectively. An outcome of this decision is held in variable c with three values denoted by S for successful transmission, E for empty time slot and C for collision of data packets. In this embodiment, if all nodes 110 with packets to send wait, then the variable c is assigned the value E since the time slot is empty. In this embodiment, if exactly one node 110 transmits in the time slot, then the variable c is assigned the value S since the time slot has a successful transmission. Similarly, if more than one node 110 transmits in the time slot, the variable c is assigned the value C since then a collision occurs. Embodiments are not limited to these specific channel variables and may include less or more variables than listed in FIG. 4.

In this embodiment, the algorithm initializes the values of the state variables listed in lines 10-13. These initial values are listed in lines 20-21. In an example embodiment, the policy $\pi$ is given an initial set of schedules that may correspond to the schedules 321, 322 of FIG. 3A. In an example embodiment, the initialization of the policy in line 12 corresponds to step 215 of the method 200.

In this embodiment, the algorithm performs a loop of lines 22-40 for each time slot t. Line 22 involves incrementing the time slot t value for the next iteration of lines 22-40. Lines 23-25 involve transmitting a data packet at the time slot, if the channel is active and otherwise waiting and not transmitting the data packet. The decision variable d is assigned the T or W value, based on this determination. Line 25 then assigns a value to a channel outcome h variable for that time slot, where the value of h corresponds to the value of the channel state c variable (e.g. E if the time slot is empty, C if a collision occurs and S if the transmission was successful). In an example embodiment, steps 215 and 217 of the method 200 correspond to decision d variable having the value T and step 219 corresponds to determining whether the channel outcome h variable has the value S.

In this embodiment, the algorithm then performs an update to the policy $\pi$ in lines 26-35, based on the decision d variable value and channel outcome h value from lines 24-25. In this embodiment, lines 27-30 correspond to steps 217, 219 and 227 of the method 200. In this embodiment, if the data packet was transmitted (step 217) and the transmission was successful (yes in block 219), then the algorithm selects a second policy by modifying the first policy $\pi$ (step 227). In lines 29-30, the algorithm modifies the policy $\pi$ with a demote operation, based on the value of the kindness probability $p_k$ variable (e.g. if $p_k$ is 0.05, then the demote operation is performed 5% of the time at line 30). The value of the kindness probability $p_k$ variable is tuned with the goal of leaving a certain fraction $\kappa$ of the time slots empty. As shown in line 5, an initial value of $\kappa$ is set at 0.05 or 5%, thus in this embodiment the goal is that about 5% of the time slots are left empty in the evaluation of the protocol.

Figure 3B:
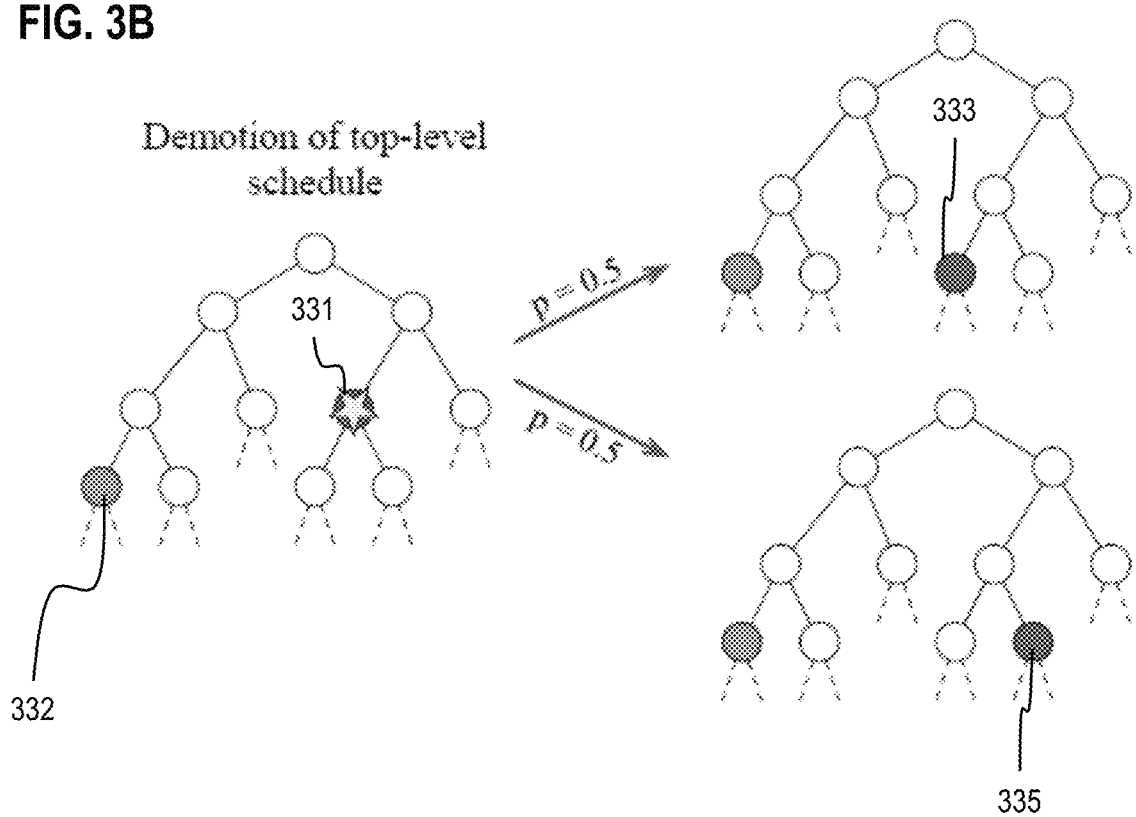
FIGS. 3B and 3C are tree charts that illustrate an example schedule tree along with a policy consisting of two schedules and removal of one schedule, according to an embodiment.
Figure 3C:
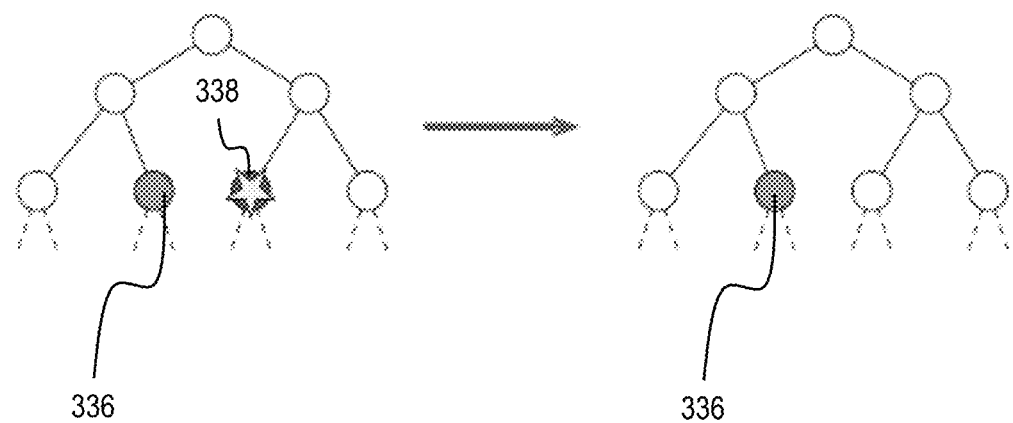

FIGS. 3B and 3C are tree charts that illustrate an example schedule tree along with a policy consisting of two schedules and demotion of one schedule, according to this embodiment. FIG. 3B depicts the demote operation where the policy includes one schedule with a higher level (smaller m value) than the other schedules. In this embodiment, FIG. 3B depicts that the policy $\pi$ included the two schedules 331, 332 prior to the demote operation. In this embodiment, the demote operation removes a higher level (smaller m) schedule (e.g. 331 in FIG. 3B) and replaces it with one of the children of the higher level schedule (e.g. either 333 or 335 in FIG. 3B). FIG. 3C depicts the demote operation where the policy includes schedules with the same layer (same m value). In this embodiment, FIG. 3C depicts that the policy $\pi$ included the two schedules 336, 338 (same m value) prior to the demote operation. In this embodiment, the demote operation removes one of the schedules (e.g. 338) and does not replace it.

In this embodiment, lines 27 and 31 correspond to steps 217, 219 and 221 of the method 200. In this embodiment, if the data packet was transmitted (step 217) and the transmission was not successful based on the channel outcome h variable having the value C (no in block 219), then the algorithm selects a second policy by modifying the first policy $\pi$ (step 221). Unlike lines 29-30, in line 31 the algorithm modifies the policy π with the demote operation, irrespective of the value of the kindness probability $p_k$ variable. The demote operation at line 31 is performed in a similar manner as discussed with respect to FIGS. 3B and 3C.

In this embodiment, the demote (π, t) operation is based on (i, m) representing a unique schedule such that t∈T(i, m). The procedure demote (π, t) removes from the policy π the schedule (i, m) (e.g. schedule 338 in FIG. 3C). Further, if {(j, k)∈ π|k≤m}=∅, then the procedure adds to π one of the two children (i, m+1) or (i+$2^m$, m+1) of the removed schedule (e.g. higher level schedule 331 in FIG. 3B), chosen uniformly at random.

Figure 3D:
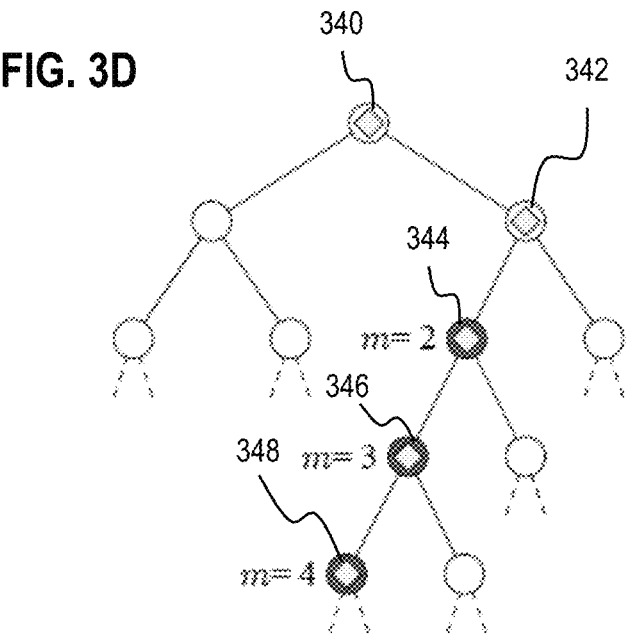
FIG. 3D is a tree chart that illustrates an example schedule tree along with a policy consisting of two schedules and addition of one schedule, according to an embodiment.

In this embodiment, lines 32 through 34 correspond to the method 200 where the data packet is not transmitted at step 217 but instead the node waits (value of d is W) and the time slot is empty (value of h is E). In this embodiment, if the data packet is not transmitted (value of d is W) and the time slot is empty (value of h is E) then the algorithm selects a second policy by modifying the first policy π. In lines 33-34, the algorithm modifies the policy π with a barge-in operation, based on the value of the barge-in probability $p_b$ variable (e.g. if $p_b$ is 0.1, then the barge-in operation is performed 10% of the time at line 34). The barge-in probability $p_b$ variable regulates how eager the nodes are to jump in and transmit in slots that are empty. The value of the probability $p_b$ variable is tuned to ensure maximal success of the transmissions in such empty slots. FIG. 3D is a tree chart that illustrates an example schedule tree along with a policy consisting of two schedules 340, 342 and addition of one schedule, according to this embodiment. In this embodiment, FIG. 3D depicts that the policy π included the two schedules 340, 342 prior to the barge-in operation. In this embodiment, the barge-in operation adds a schedule to the policy with a lower level (higher m value), such as one of policies 344, 346, 348 since these policies would have transmitted in the empty time slot.

In this embodiment, the barge-in (π, t, $\Delta_{new}$) operation adds to the policy π a schedule (i, m) such that t∈T(i, m). If the bandwidth of the node's policy is defined by $$b=\Sigma_{(i,k)\in\pi}2^{-k} \qquad (1)$$

where k represents the order (e.g. m value) of each schedule in the policy. The schedules (i, m) that can be added to the policy based on the barge-in function are provided by equations 2-3:

$$m = \left[\log_2\left(\frac{1}{p_b}\right) + \left[\log_2\left(\frac{b}{p_b}\right)\right]_{-1}^{1} + \Delta_{new}\right] \qquad (2)$$

$$i = t \bmod m \qquad (3)$$

As discussed with respect to FIG. 3D, one or more schedules (i, m) are obtained by equations 2-3 that can be selected and added to the policy (e.g. schedule 344 or m=2, schedule 346 or m=3, schedule 348 or m=4, etc.). The barge-in operation advantageously adds a schedule to the policy that transmits data packets at the empty time slot. Additionally, adding a lower level (e.g. higher m value) schedule to the policy reduces the bandwidth of the policy (relative to adding a policy at a higher level), based on equation 1.

After this policy update (e.g. lines 27-34 of the algorithm), the policy π is pruned and brought back into normal form via a normalize procedure. In this embodiment, the normalize procedure is performed in steps 221 or 227. The normalize operation is based on the parameters policy π, maximum number of schedules M and the maximum schedule level difference Δ. To normalize a policy π, it is first put in normal form, removing any schedule that is a descendant of another schedule in the tree and/or merging sibling schedules. To do so, the following steps are repeated until they can no longer be taken.

Figure 3E:
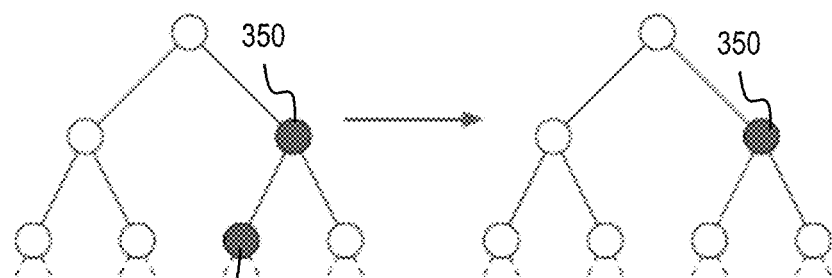
FIG. 3E is a tree chart that illustrates an example schedule tree along with a policy consisting of two schedules and descendant elimination, according to an embodiment.

A first step to put the policy into normal form is descendant elimination. FIG. 3E is a tree chart that illustrates an example schedule tree along with a policy consisting of two schedules 350, 352 and descendant elimination, according to this embodiment. As shown in FIG. 3E, the descendant elimination removes schedule 352 since it is a descendant of schedule 350.

Figure 3F:
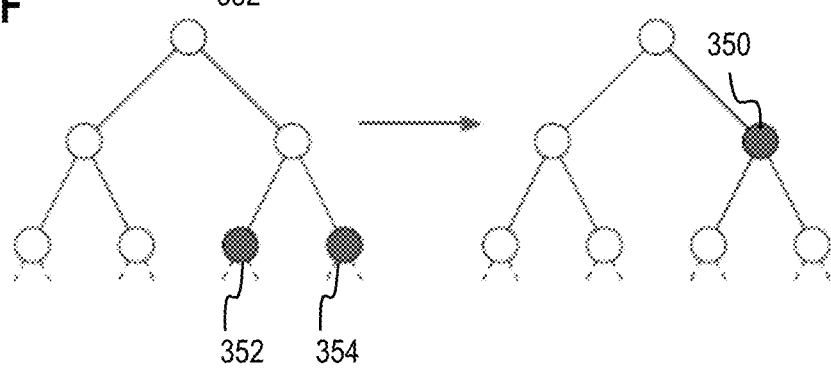
FIG. 3F is a tree chart that illustrates an example schedule tree along with a policy consisting of two schedules and merging of sibling schedules, according to an embodiment.

A second step to put the policy in normal form is sibling merging. FIG. 3F is a tree chart that illustrates an example schedule tree along with a policy consisting of two schedules 352, 354 and merging of sibling schedules, according to this embodiment. As shown in FIG. 3F, the sibling merging step removes schedules 352, 354 since they are siblings and merges them to schedule 350 that is added to the policy.

Figure 3G:
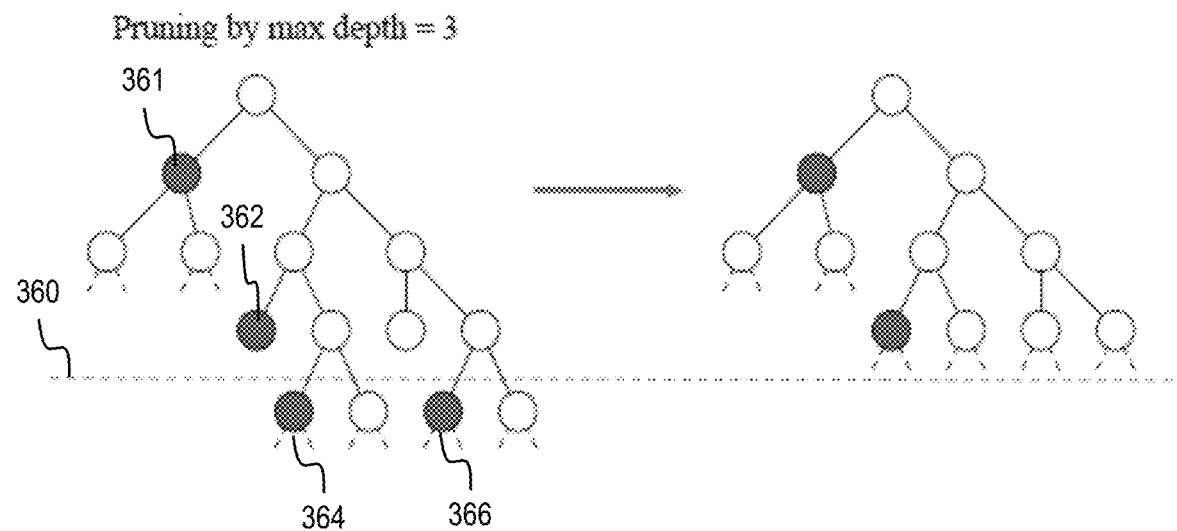
FIGS. 3G and 3H are tree charts that illustrate an example schedule tree along with a policy consisting of multiple schedules and removal of schedules, according to an embodiment.

In this embodiment, after the policy is placed in normal form, the policy is pruned in one or more steps. A first step of pruning the policy is based on a maximum depth or layer of schedules in the policy. FIG. 3G is a tree chart that illustrates an example schedule tree along with a policy consisting of multiple schedules at different layers including schedule 361 at layer 311 (m=1), schedule 362 at layer 313 (m=3) and schedules 364, 366 at layer 314 (m=4). In this embodiment, a maximum depth or layer 360 is provided (e.g. m=3) and all schedules below the maximum depth or layer are eliminated. Pruning based on maximum depth or level is based on a minimum level of a schedule in the policy (e.g. layer 311 or m=1 of schedule 361 in FIG. 3G) and the maximum schedule level difference Δ (lines 8 of algorithm in FIG. 4). In an example embodiment, if the maximum schedule level difference Δ is 2, then all schedules below layer 313 are eliminated (e.g. schedules 364, 366 in FIG. 3G).

Figure 3H:
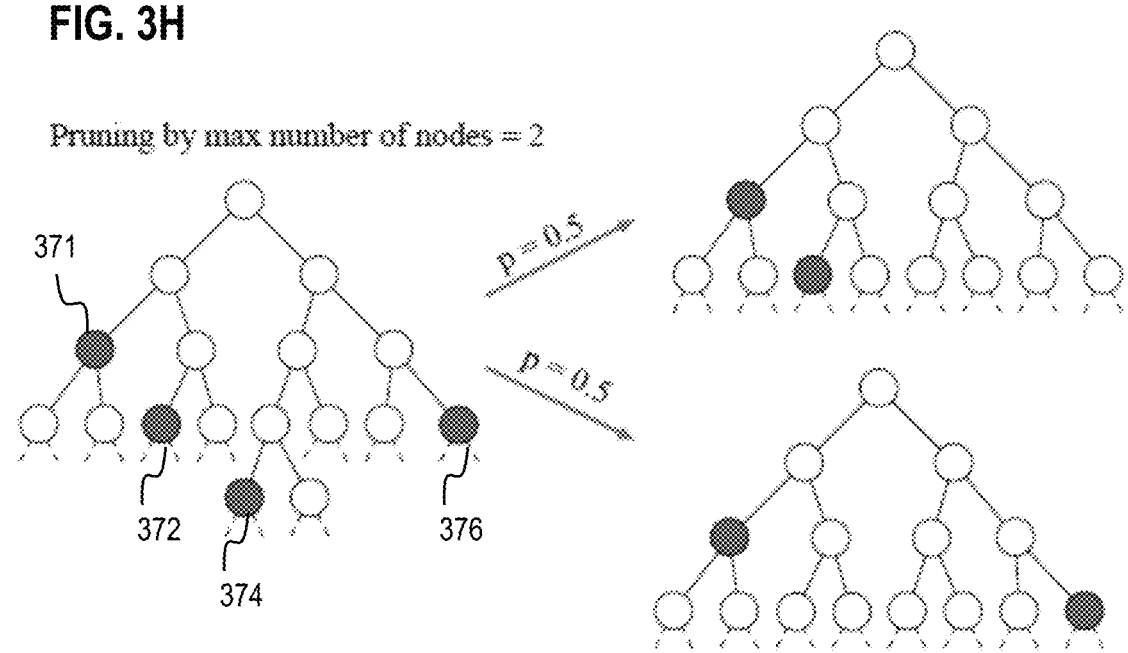

In this embodiment, a second step of pruning the policy is based on a maximum number of schedules in the policy. In this embodiment, the algorithm prunes the policy so that it contains at most M schedules (line 7 of algorithm). In this embodiment, if the policy π has less than or equal to M schedules, then no action is taken. Otherwise, a parameter $n_k$ is defined:

$$n_k=|\{(i,m)\in \pi|m\leq k\}| \qquad (4)$$

and k is the largest integer such that $n_k \leq m$. In this embodiment, the algorithm removes from the policy π all schedules (i, m) with m>k+1 and randomly selects M−$n_k$ amount of policies at level k+1, that is policies of the form (j, k+1) for some j. FIG. 3H is a tree chart that illustrates an example schedule tree along with a policy consisting of multiple schedules 371, 372, 374, 376 that exceeds a maximum number M (e.g. 2) of schedules for the policy. In this embodiment, the variable k corresponds to the layer 312 of the schedule 371 and k+1 corresponds to the layer 313 of schedules 372, 376. Thus, the policy 374 at layer 314 is eliminated since its m value exceeds k+1. In this embodiment, schedule 371 is selected and randomly one of the schedules 372 or 376 at layer 313. In this embodiment, FIG. 3H depicts that selecting schedule 372 or 376 has about equal probability (p=0.5).

In this embodiment, after the policy update in lines 26-35 of the algorithm, the values of the probability variables ($p_k$, $p_b$) are updated in lines 37-40 of the algorithm. The values of the kindness and barge-in probabilities $p_k$ and $p_b$, together, ensure that every active node receives a fair share of the total bandwidth. The kindness probability ensures that a node has a non-zero (bounded from below) probability of relinquishing any transmission slots it holds via a schedule. In particular, nodes that transmit in more slots (and thus use higher bandwidth) relinquish proportionately more bandwidth than nodes using fewer slots. Every free slot has the same probability of being scheduled by any node for future transmissions. Together, this ensures that the bandwidth tends to be uniformly distributed among the nodes participating in the protocol. The values of the probability $p_k$ and $p_b$ variables are tuned dynamically as follows.

In this embodiment, the value of the kindness probability $p_k$ is tuned based on line 37. The value of the kindness probability $p_k$ is tuned so that a prescribed fraction of transmission slots κ (e.g. with a value of 0:05 or 5% in line 5) are left free. Initially, when a node becomes active, we arbitrarily set the value of $p_k$ to the value of κ (e.g. 0.05). Thereupon, nodes update the value of $p_k$ according to the value of the channel outcome h variable (E, S, C) as follows:

$$E: p_k := p_k \times \alpha_k^{1/k} \quad (5)$$

$$S, C: p_k := \frac{p_k}{\alpha_k} \quad (6)$$

where $\alpha_k$ (e.g. value of 0.98) is a coefficient determining the adaptation speed (line 1 of algorithm). Thus, the value of $p_k$ decreases whenever there is an empty slot and increases when the slot is utilized (either successfully, or via a collision). The value of $p_k$ stabilizes when there are n successful slots for each empty slot, with $\alpha_k^{1/k} = \alpha_k^n$ or when $$n = \frac{1}{k} = 20.$$

The selection of the value of $\alpha_k$ (e.g. 0.98) leads to an adaptation time of the order of $$\frac{1}{\alpha_k} = 50$$

transmission slots. The use of a lower bound value $q_k$ for the variable $p_k$ stabilizes the algorithm and facilitates its analysis.

In this embodiment, the value barge-in probability $p_b$ variable is tuned based on lines 38-39. The barge-in probability is used to regulate the number of nodes that try to use empty slots. If too many nodes add schedules when they see an empty slot, many collisions would result; if too few add schedules, too many empty slots are left. The value of the barge-in probability $p_b$ is tuned by considering the ratio of collision to free slots. The tuning specifically disregards the successful slots, as the bulk of them is due to the existing coordination among nodes, rather than to successful barge-in. To understand how the tuning is performed, consider a simplified model in which a node barging in corresponds directly to a transmission by the node in the next period. This is a simplification: the node schedules that exist or are added via barge-in are not necessarily at the same tree layer, and thus, do not necessarily share the same periodicity. However, as the results show, this simplified model suffices for tuning the barge-in probability.

If there are n active nodes and each of them barges-in with probability q, then a time slot remains empty with probability $(1-q)^n$, it is used successfully with probability $nq(1-q)^{n-1}$ and there are collisions of packets in the time slot with probability $1-(1-q)^n-nq(1-q)^{n-1}$. The probability of successful transmission is maximized for $$q = \frac{1}{n}$$

when n nodes are active. Under this optimal choice of q, as the number of nodes grows, the probability of the slot remaining free is:

$$\lim_{n \to \infty} \left(1 - \frac{1}{n}\right)^n = \frac{1}{e} \quad (7)$$

where e≈2.718 is the basis of the natural logarithm. For the optimal value of q, the collision probability tends to:

$$\lim_{n \to \infty} 1 - \left(1 - \frac{1}{n}\right)^{n-1}\left(1 + \frac{n-1}{n}\right) = \frac{2}{e} \quad (8)$$

For the optimal barge-in probability, when the number of nodes is large, the ratio of free to collision slots is:

$$\frac{1/e}{1 - 2/e} = \frac{1}{e-2} \approx 1.39 \quad (9)$$

Thus, the nodes will tune their barge-in probability so that the ratio of free to collision slots is 1/(e−2). This can be accomplished similarly to the steps taken for kindness probability. Nodes initially set the value of $p_b$ at 0.1, and they update the value of $p_b$ when empty slots or collisions occur (lines 38-39 of the algorithm in FIG. 4):

$$E: p_b := p_b/\alpha_b \quad (10)$$

$$C: p_b := p_b \times \alpha_b^{1/(e-2)} \quad (11)$$

As shown in line 2 of the algorithm, for the adaptation coefficient $\alpha_b$, it is set at an initial value of 0.99.

In this embodiment, the barge-in probability $p_b$ provides an estimate $\tilde{n} = 1/p_b$ of the number of active nodes in the protocol. If there were $\tilde{n}$ nodes sending packets in turn, a new schedule would be inserted at a level at least $\log_2(\tilde{n})$ to ensure that the new schedule has sufficiently large periodicity, for all nodes to send during the period. However, choosing $m = \log_2(\tilde{n})$ would be too aggressive, as this corresponds to adding a schedule that, alone, has as much bandwidth as can be allocated to the node. For this reason, to $\log_2(\tilde{n})$ a constant $\Delta_{new}$ and a correction factor $$\left\lceil \log_2\left(\frac{b}{p_b}\right)^1_{-1} \right\rceil$$

are added before taking the ceiling. The correction factor is controlled by the ratio between the bandwidth b of the node's policy, and the probability $p_b = 1/\tilde{n}$ it should be fairly allocated according to the node's estimate. If $b < p_b$, the node is allocated less bandwidth it deserves, and the correction factor is negative, leading to the insertion of a schedule with higher bandwidth. If $b > p_b$ it is positive, leading to the insertion of a schedule with lower bandwidth. This correction factor thus promotes fairness. In an example embodiment, the value of $\Delta_{new}$ is set to 2 (line 9 of the algorithm in FIG. 4). Choosing a small value of $\Delta_{new}$ (e.g. 1) leads to a faster-adapting network, as empty slots in the channel are more quickly exploited by active nodes. Larger values for $\Delta_{new}$ (e.g. 3) makes the nodes less aggressive in appropriating empty slots, and results in a fairer distribution of bandwidth among nodes, at the cost of slower adaptation rates. In an example embodiment, a value for $\Delta_{new}$ is set at 2 as a compromise between these two values.

In this embodiment, lines 22-40 of the algorithm are repeated for each time slot and/or for each node in the network. In an example embodiment, repeating lines 22-40 corresponds to step 231 where the end condition occurs when the last time slot is processed and/or when the algorithm is performed for each node in the network.

2.2 Performance Data

The performance of the algorithm (APT-ALOHA) is compared with the performance of two conventional algorithms, framed slotted ALOHA and ALOHA-Q by means of simulations. In this embodiment, protocols are written as Python classes: by swapping the class used for the nodes in the network simulator, the performance of these protocols can be compared under the same settings. A fully-connected single-channel wireless network is considered for the comparisons. The channel is time slotted, and for the purposes of frames slotted ALOHA-Q the time slots are organized into transmission frames of 64 time slots each. The length of a time slot equals a packet length, which is assumed to be a constant. The number of active nodes is changed for different scenarios. The performance of the three protocols is compared in terms of their bandwidth utilization, and of their fairness.

The network utilization metric is now discussed. Every individual time slot is either empty, or it contains a successful transmission or a collision. To show how the network utilization evolves over time, time slots are aggregated in blocks of 100: for each block the utilization is computed as the fraction of individual slots that contains a successful transmission. Similarly, the fraction of empty and collision time slots in each block is measured. Using blocks of length 100 offers a compromise between having a fine time resolution, and computing meaningful statistics on each block.

The fairness metric is now discussed. The fairness of a protocol indicates how equitably the bandwidth of the protocol is distributed among the nodes. Two measurements of fairness are provided. The first is the Jain's index. Assume that n nodes are active in a time block and let $b_i$ be the number of successful transmissions in the slot by node $i \in |1, \ldots n|$. Let $B = \sum_{i=1}^{n} b_i$ be the bandwidth in the slot. Jain's index is computed as:

$$J = \frac{B^2}{n \sum_{i=1}^{n} b_i^2} \quad (12)$$

Jain's index variable J is a variable with a value in a range between 0 and 1; the value of J is 1 for a perfectly fair distribution of the channel $$\left( b_i = \frac{B}{n} \text{ for all } i \right)$$

and the value of J is 0 if only one node gets to use the channel. The other measure used is the bottom-10% fair share. To compute it, the nodes are sorted in order of bandwidth, so that $b_1 \leq \ldots \leq b_n$, and let $m = [n/10]$. Then, $B_{10} = \sum_{i=1}^{m} b_i$ is the cumulative bandwidth of the bottom 10% of the nodes, and $$F_{10\%} = \frac{nB_{10}}{mB} \quad (13)$$

is the ratio between the actual bandwidth for the bottom 10%, and the bandwidth the bottom 10% would receive under fair allocation. The $F_{10\%}$ measure variable has a value in a range between 0 and 1, like Jain's index. While Jain's index captures the fairness of the overall allocation, the $F_{10\%}$ measure variable captures how the most "unfortunate" nodes fare in the protocol.

Figure 5A:
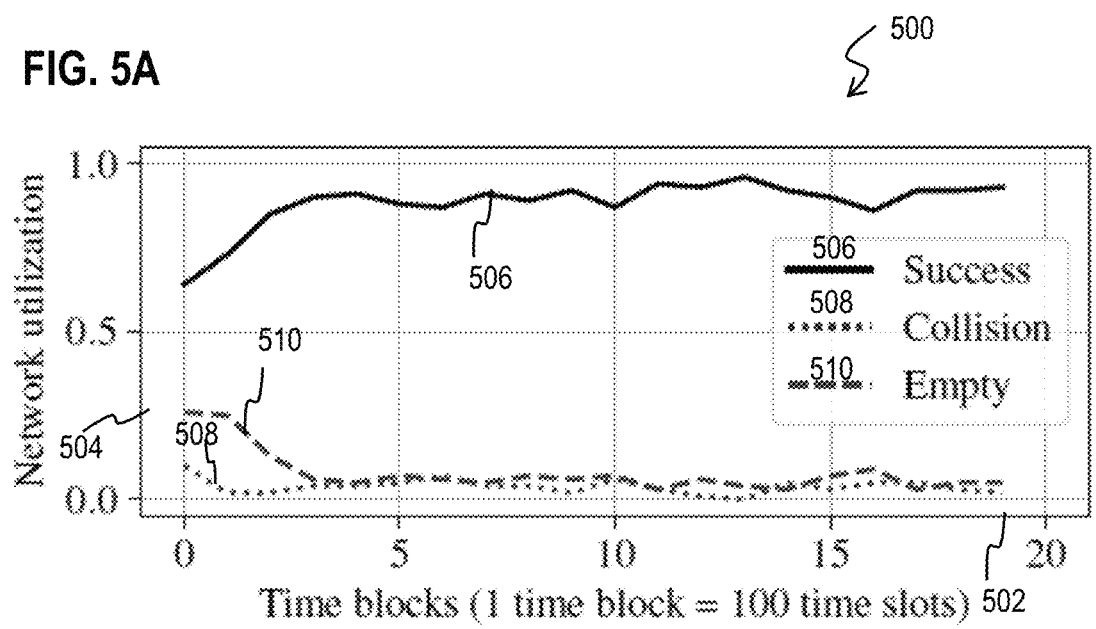
FIGS. 5A and 5B are graphs that illustrate example traces that indicate network utilization and fairness using the method of FIG. 2 with multiple nodes joining simultaneously, according to an embodiment.
Figure 5B:
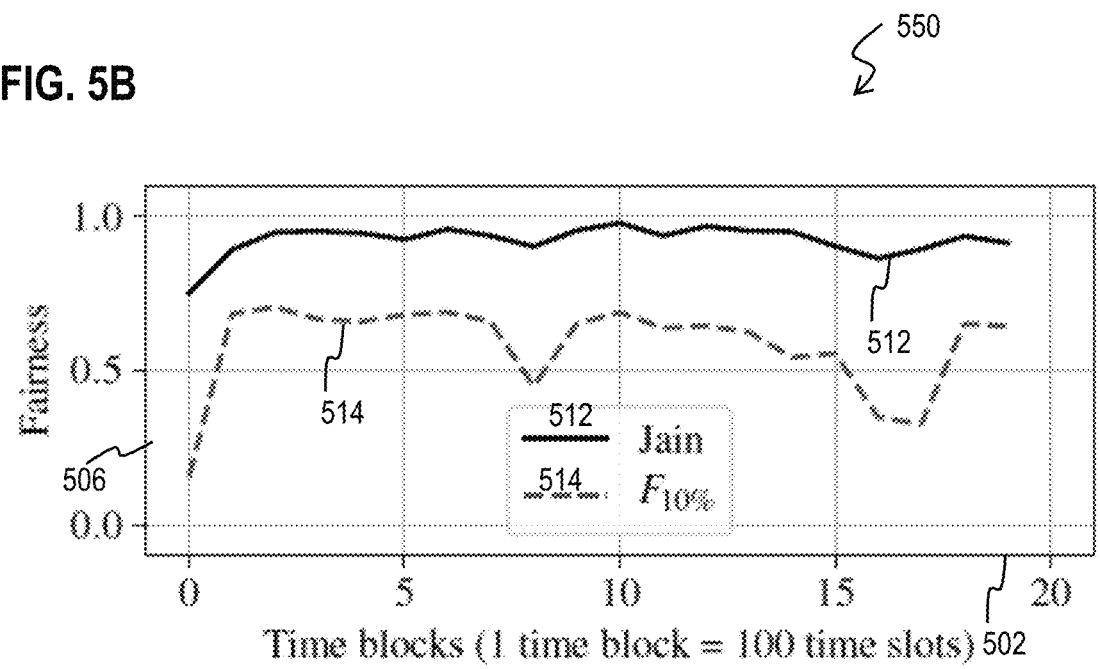

FIGS. 5A and 5B are graphs that illustrate example traces that indicate network utilization and fairness using the method of FIG. 2 with multiple nodes joining simultaneously, according to an embodiment. The horizontal axis 502 is time blocks, where one time block corresponds to 100 time slots. The vertical axis 504 is network utilization (unitless). The vertical axis 506 is fairness (unitless). Curves 506, 508, 510 of the graph 500 of FIG. 5A indicate the respective network utilization for success, collision and empty time slots. FIG. 5A illustrates the performance and fairness of the APT-ALOHA protocol in a network with 10 active nodes that starts with a cold start. The bandwidth utilization surpasses 75% within a couple of time blocks, that is, within 200 time slots: this demonstrates the fast adaptation speed of the protocol. Curve 512 of FIG. 5B indicates Jain's fairness index which has a value close to 1, and curve 512 indicates the $F_{10\%}$ measure which has a value generally above 0.5: this indicates that the allocation of bandwidth to the nodes is fair, and in particular, that the node receiving the least bandwidth in each 100-time slots block receives at least half of the average node bandwidth.

Figure 6A:
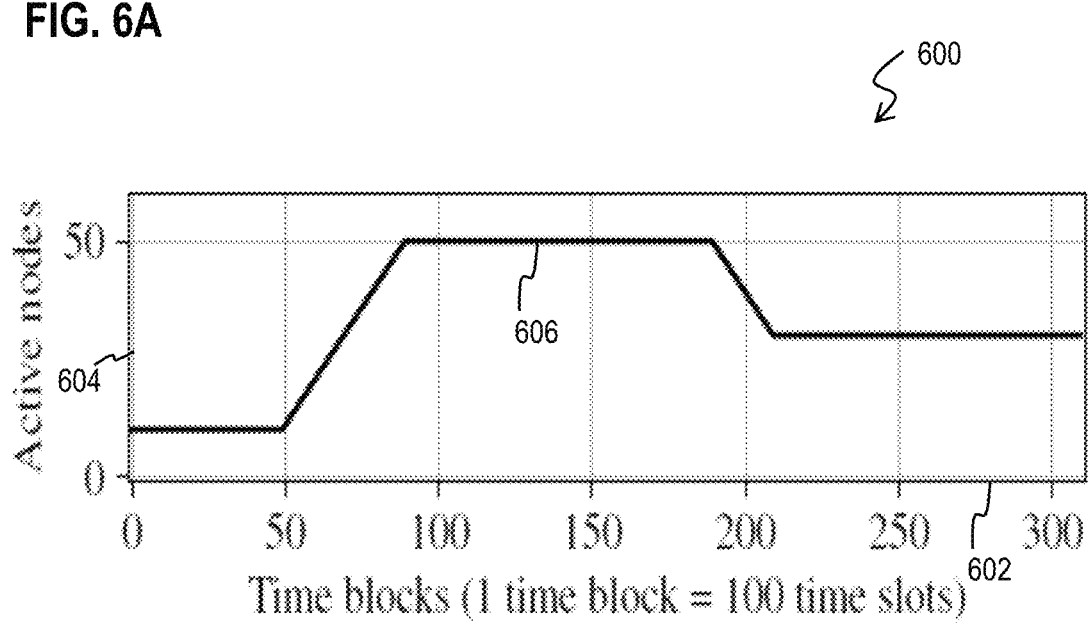
FIGS. 6A through 6C are graphs that illustrate example traces that indicate network utilization and fairness using the method of FIG. 2 when the number of active nodes increases, according to an embodiment.
Figure 6B:
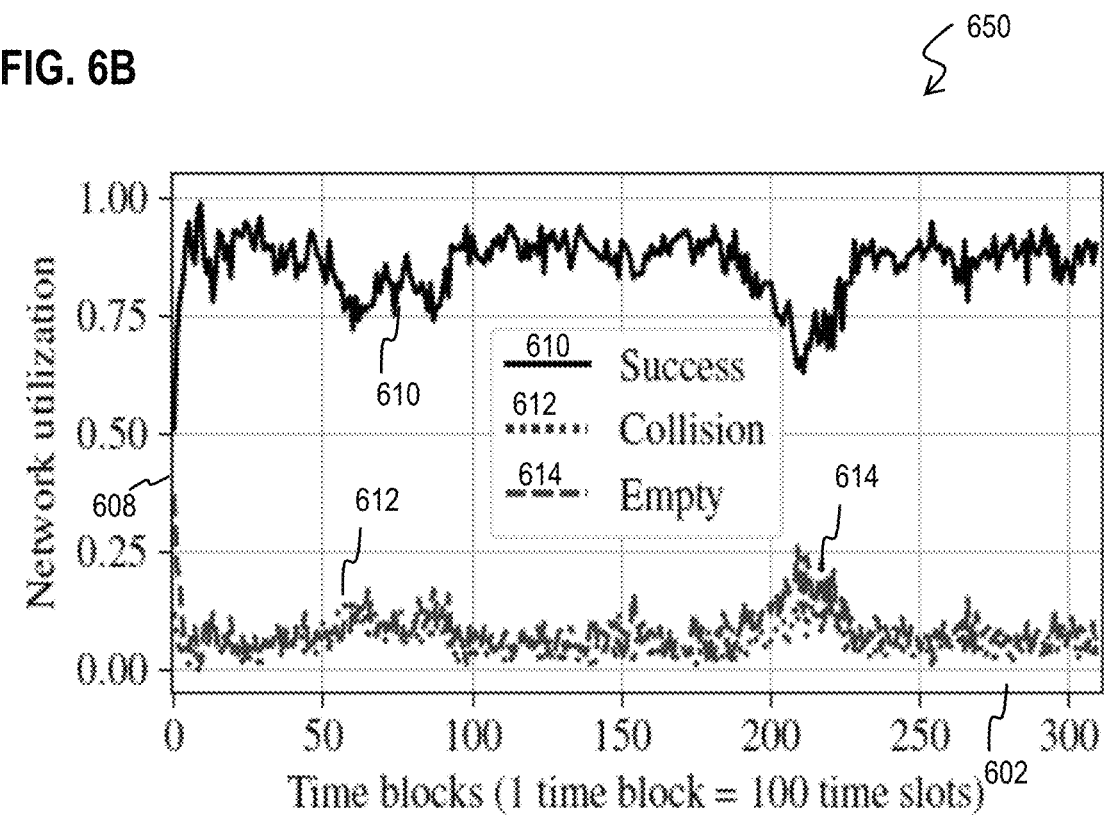
Figure 6C:
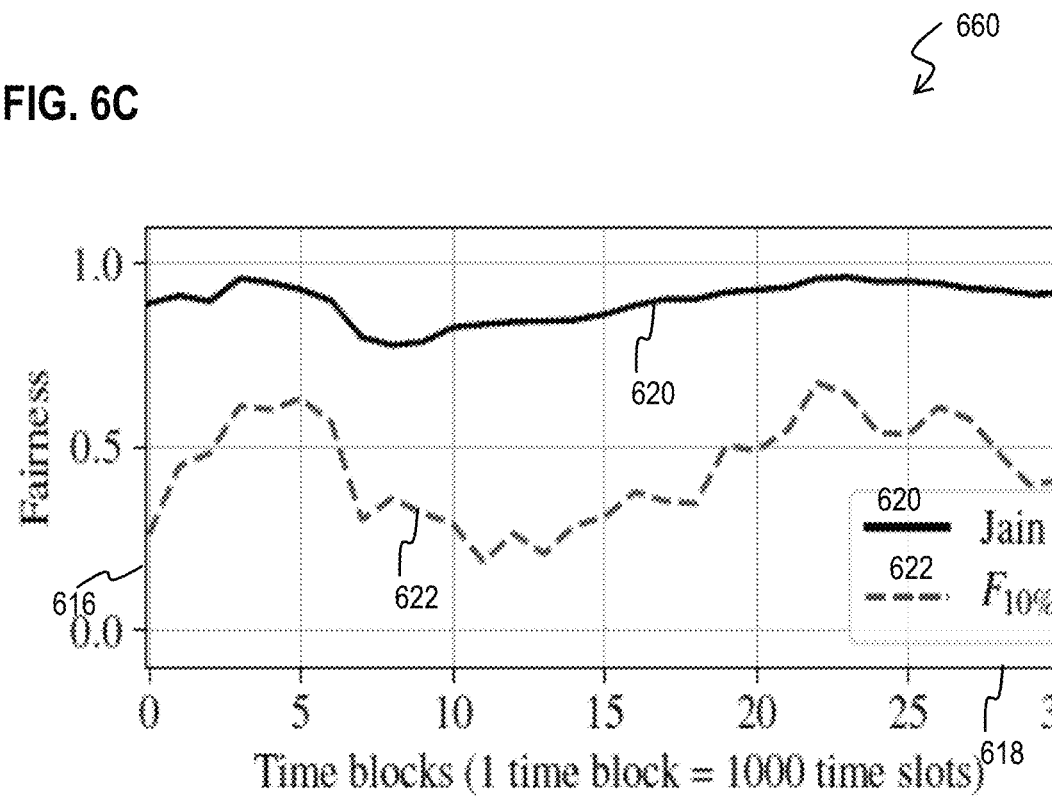

FIGS. 6A through 6C are graphs 600, 650, 660 that illustrate example traces that indicate network utilization and fairness using the method of FIG. 2 when the number of active nodes increases, according to an embodiment. The horizontal axis 602 is time blocks, where one time block corresponds to 100 time slots. The vertical axis 604 indicates a number of active nodes. The vertical axis 608 is network utilization (unitless). The vertical axis 616 is fairness (unitless). FIGS. 6B and 6C illustrate the performance and fairness of the APT-ALOHA protocol when the number of active nodes is initially 10, then ramps up to 50, and finally ramps down to 30, as shown in curve 606 of FIG. 6A. Curves 610, 612, 614 of FIG. 6B indicate the respective utilization of the success, collision and empty time slots. The utilization represented by curve 610 remains in the 85% to 90% range in the steady-state periods when nodes neither join nor leave (e.g. when the curve 606 remains at a constant value). During the transients, the utilization is still above 75% when ramping up, and above 60% when ramping down. Curve 620 of FIG. 6C indicates the Jain fairness index which has a value close to 1. Curve 622 of FIG. 6C indicates the $F_{10\%}$ measure which demonstrates that the bottom 10-percentile of nodes still receives generally half of the average bandwidth, and in any case, more than 20% of the average. In this simulation and the next, time blocks of 1000 time units are used when studying fairness, to ensure that the bandwidth of each node is not unduly affected by statistical fluctuations (if 100-slot blocks were used, each of the 50 nodes would transmit only a couple of times in a block on average, and the statistical fluctuations would mask the true value of fairness).

Figure 7A:
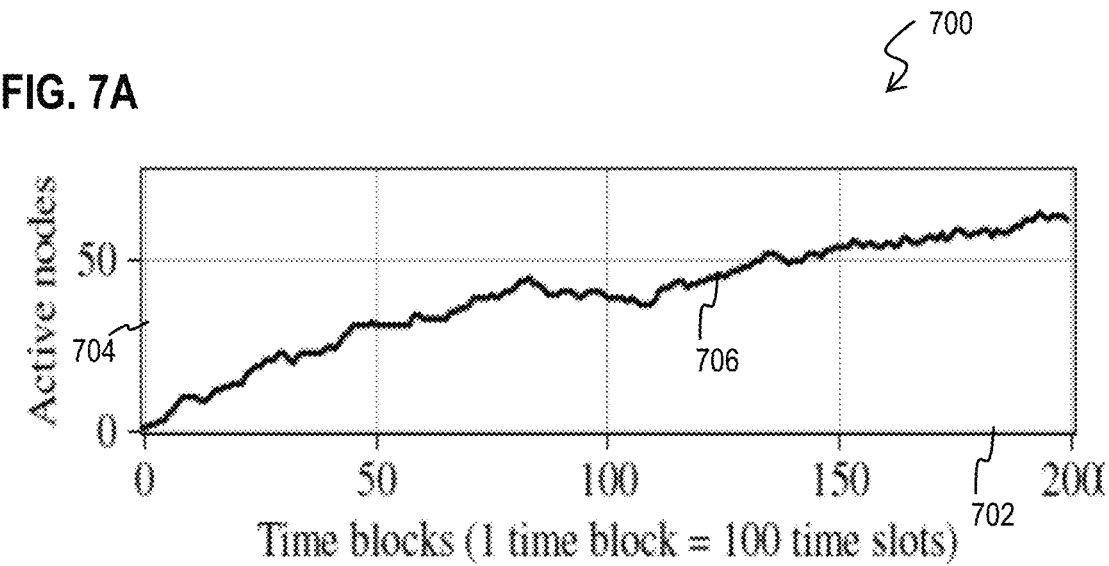
FIGS. 7A through 7C are graphs that illustrate example traces that indicate network utilization and fairness using the method of FIG. 2 when the number of active nodes increases, according to an embodiment.
Figure 7B:
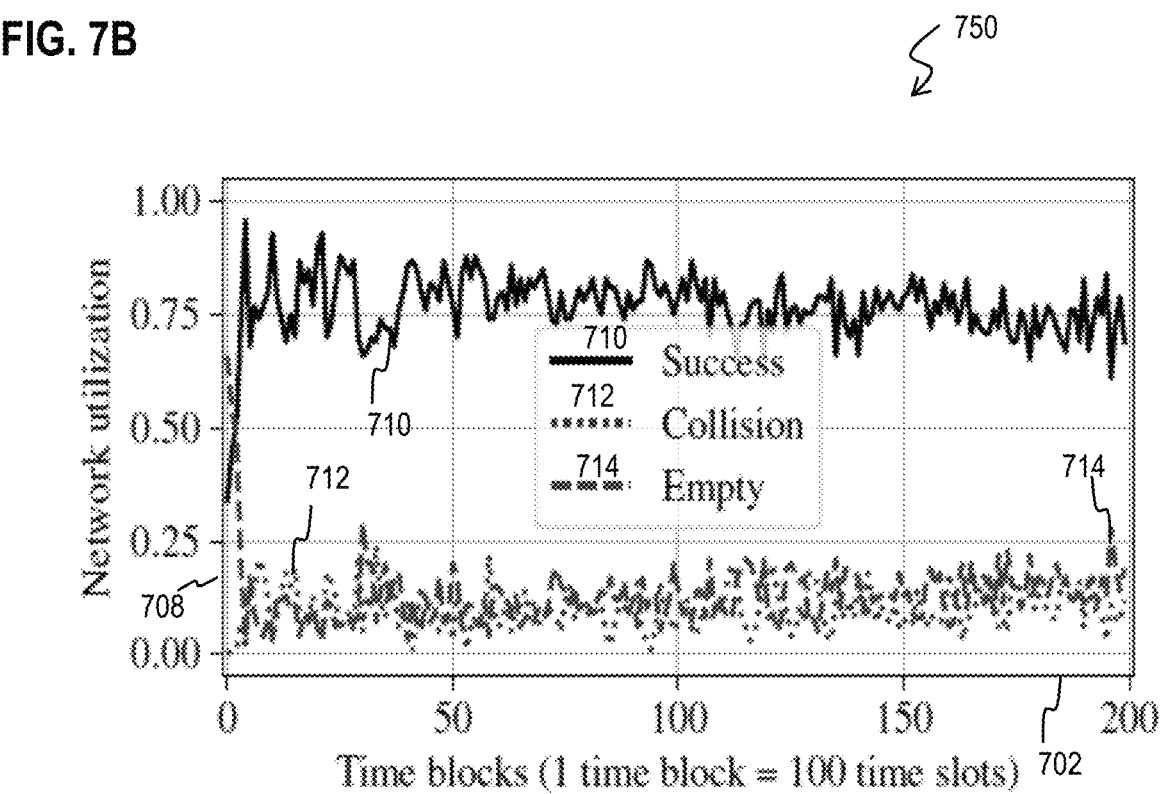
Figure 7C:
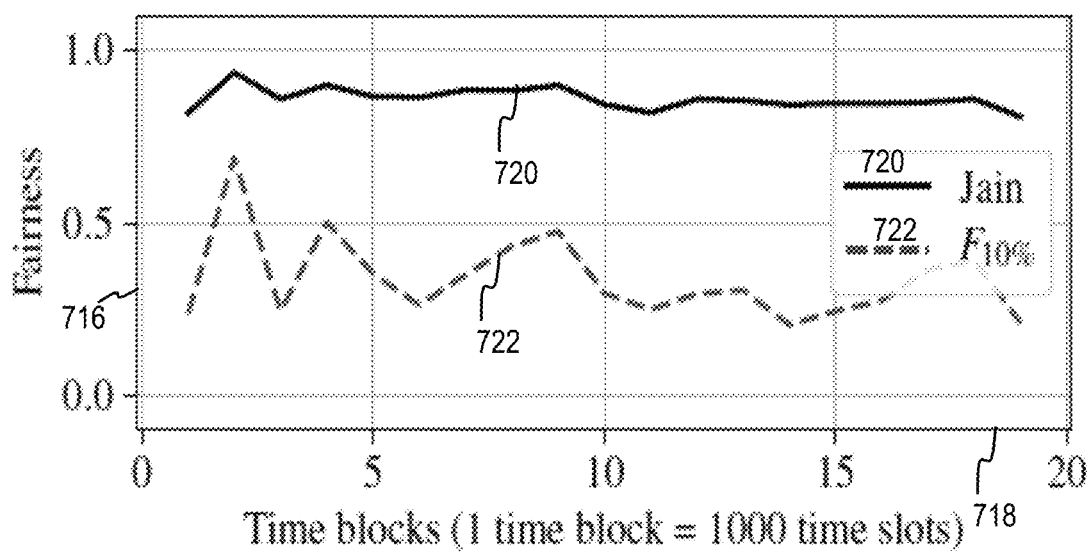

FIGS. 7A through 7C are graphs 700, 750, 760 that illustrate example traces that indicate network utilization and fairness using the method of FIG. 2 when the number of active nodes increases, according to an embodiment. The horizontal axis 702 is time blocks, where one time block corresponds to 100 time slots. The vertical axis 704 indicates a number of active nodes. The vertical axis 708 is network utilization (unitless). The vertical axis 716 is fairness (unitless). FIGS. 7B and 7C illustrate the performance of the APT-ALOHA protocol when nodes randomly become active or turn inactive. Curves 710, 712, 714 of FIG. 7B indicate the respective utilization of the success, collision and empty time slots. The network comprises 100 nodes, of which only one is initially active. At each time block, each node has probability 1/100 of switching state, from inactive to active, or vice versa. Thus, on average, in each time block one node changes state. Under these mutable network conditions, the curve 710 of FIG. 7B indicates that the APT-ALOHA protocol maintains utilization around 75%, and the curve 720 of FIG. 7C indicates that the Jain's fairness index has a value above 0.8.

Figure 8:
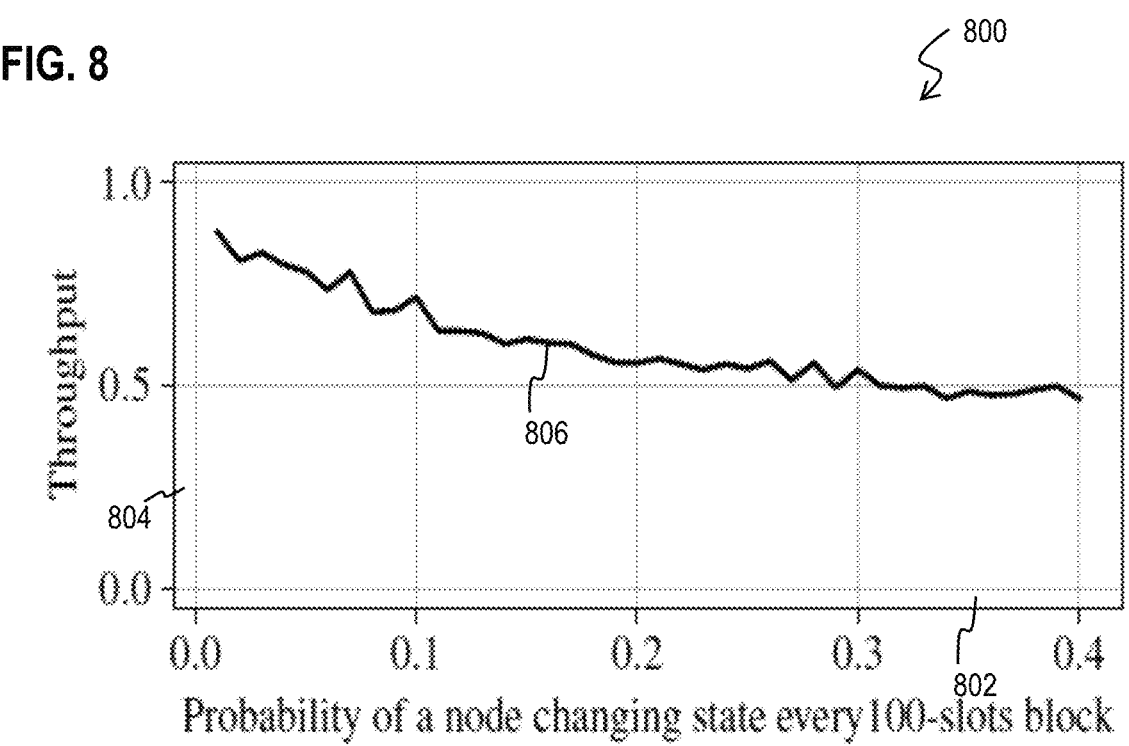
FIG. 8 is a graph that illustrates an example trace that indicates average network successful utilization using the method of FIG. 2 as a function of each node changing its active state each time block, according to an embodiment.

As the nodes become active or inactive at a faster pace, eventually the performance of APT-ALOHA degrades. FIG. 8 is a graph 800 that illustrates an example trace that indicates average network successful utilization using the method of FIG. 2 as a function of each node changing its active state each time block, according to an embodiment. The horizontal axis 802 is a probability of a node changing states every time block and the vertical axis 804 is throughout (unitless). In an embodiment, the curve 806 of FIG. 8 indicates the steady-state throughput of a network of 20 nodes, as a function of the probability of a node toggling active-inactive state each 100-time slots block. Even when the toggling probability reaches 0.4, corresponding to 8 nodes on average changing state every 100-slot block, the network still has a successful utilization of about 0.5.

The performance of the APT-ALOHA algorithm is compared with that of two versions of exponential-backoff ALOHA (EB-ALOHA and EB-ALL-ALOHA), and with the performance of the ALOHA-Q protocol. EB-ALOHA is the standard slotted ALOHA with exponential-backoff. In EB-ALOHA, every node, when becoming active, has an initial transmission probability p value of ½. Whenever the node transmits, it updates the transmission probability, setting p:=∝p in case of collision, and $$p := \text{Min}\left(1, \frac{p}{\propto}\right)$$

in case of success, where $\propto$ is a constant that determines adaptation speed. For purposes of these simulation, a value of 0.9 is used for $\propto$. The EB-ALL-ALOHA protocol is similar to EB-ALOHA, except that nodes update their transmission probabilities following all successful transmissions or collisions, rather than only those in which they took active part.

The performance of the APT-ALOHA algorithm is also compared with ALOHA-Q which is the Q-learning version of ALOHA. The ALOHA-Q is based on a periodic frame of fixed length n. Each node stores q-values $q_1; q_2; \ldots q_n$, where $q_i$ represents the quality of the decision of transmitting in the i-$^{th}$ slot of the frame. At every frame, the protocol transmits in a slot i with maximal $q_i$; if the transmission is successful, it increases $q_i$; if a collision occurs, it decreases $q_i$ and it follows a randomized backoff before retrying. The bandwidth utilization of ALOHA-Q increases with the number in of active nodes, approaching m/n, as long as, m≤n; when m>>n, the protocol behaves in a similar fashion to EB-ALOHA. In the simulations, frames of n=64 time slots are considered that ensures that there are always slightly more frame slots than active nodes, thus ensuring that the protocol works as intended.

FIGS. 9A through 9C and FIGS. 10A through 10C compare the performance of APT-ALOHA, EB-ALOHA, EBALL-ALOHA, and ALOHA-Q in the same settings used for FIGS. 6A through 6C and FIGS. 7A through 7C, respectively. The horizontal axes 902 and 1002 are time blocks, where one time block corresponds to 100 time slots. The vertical axes 904 and 1004 indicate a number of active nodes. The vertical axes 908, 1008 is network utilization (unitless). The vertical axes 920, 1020 is fairness (unitless). In terms of network utilization, Curves 910 through 916 of FIG. 9B and curves 1010 through 1016 of FIG. 10B indicate that the only protocol that is competitive with APT-ALOHA is EB-ALOHA. The problem is that EB-ALOHA achieves its high network utilization via an extremely unfair allocation of bandwidth, leading to the Jain index variable J having a value close to 0 as shown in curves 924 and 1024 of FIGS. 9C and 10C. In EB-ALOHA, nodes that are successful in transmitting will increase their transmission probability, while nodes whose transmissions are unsuccessful due to collisions will reduce their transmission probability. This amplifies any initial random difference in transmission success, leading to a winner-takes-all situation in which one node uses most of the bandwidth, transmitting with very high probability, while other nodes are mostly silent.

Figure 9A:
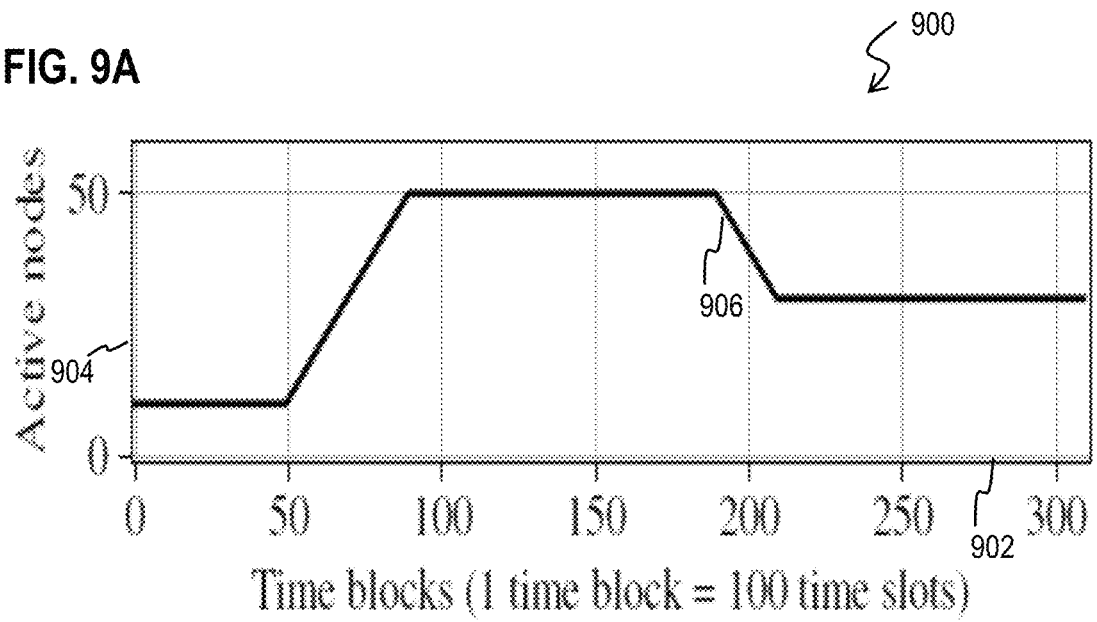
FIGS. 9A through 9C are graphs that illustrate example traces that compare network utilization and fairness of the method of FIG. 2 with conventional methods where the number of active nodes ramps up and down, according to an embodiment.
Figure 9B:
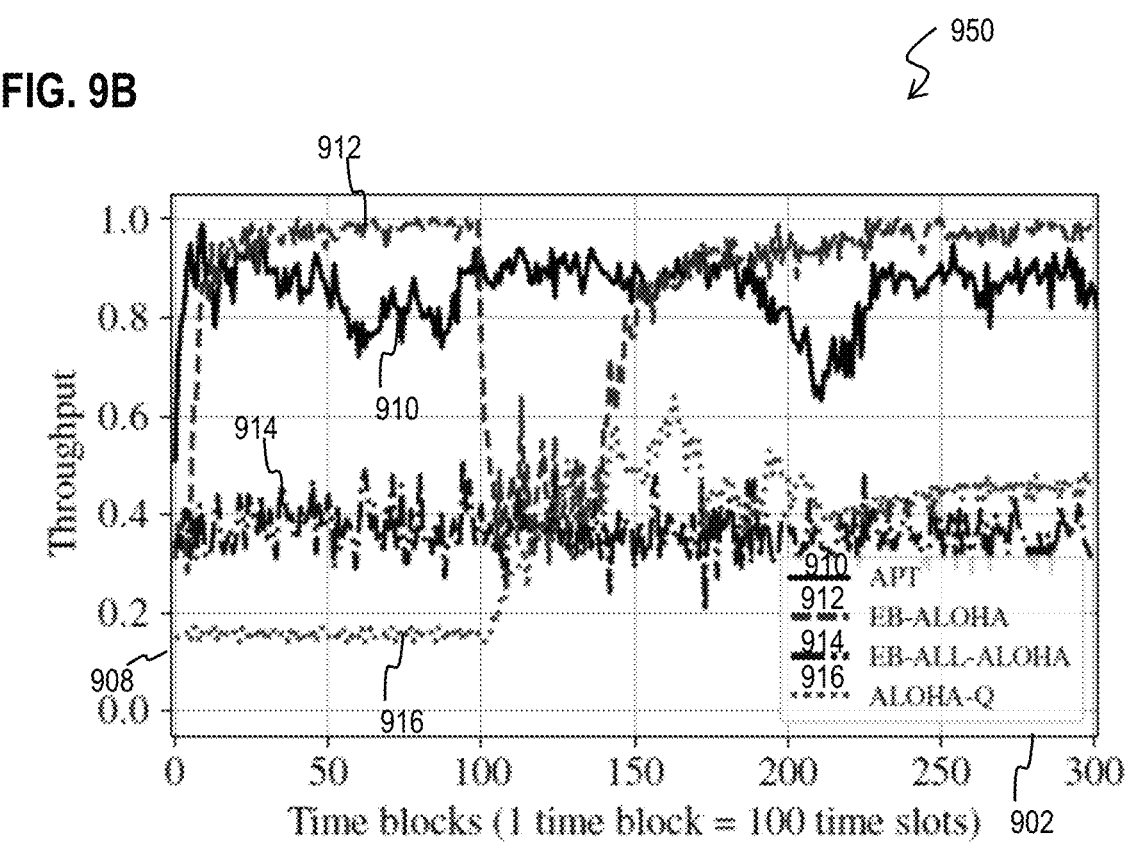
Figure 9C:
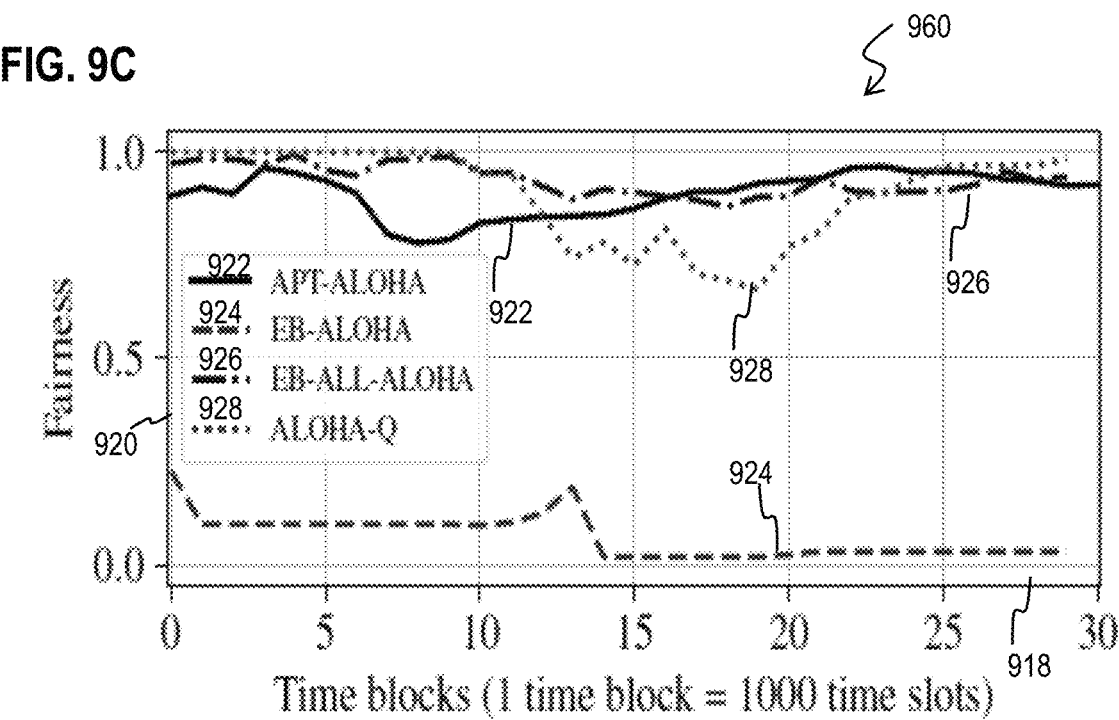
Figure 10A:
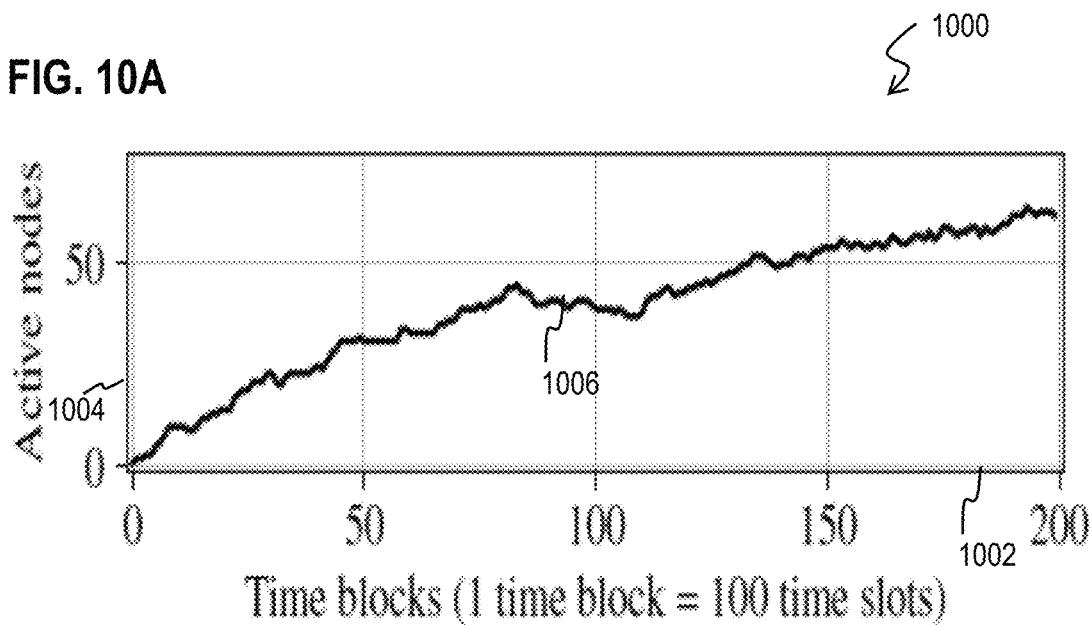
Figure 10B:
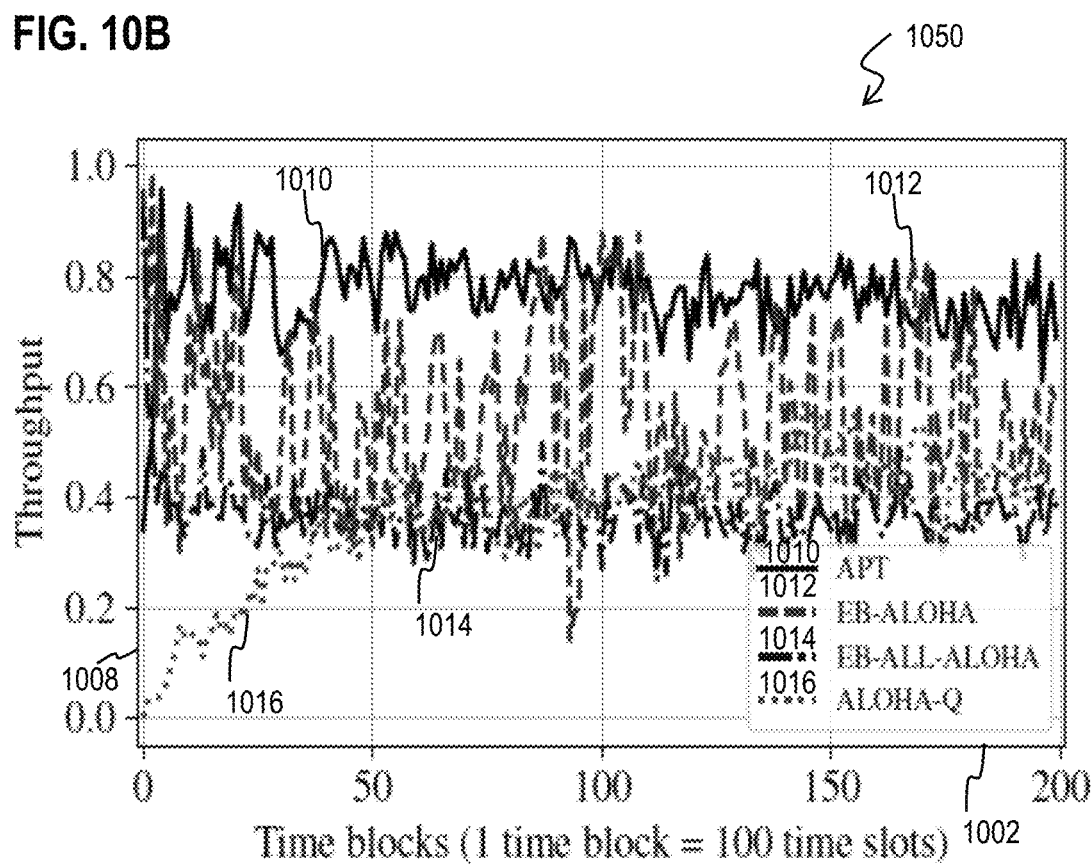

As shown in curves 914, 1014 of FIGS. 9B and 10B, the EB-ALL-ALOHA protocol manages to achieve the optimal network utilization of 1/e≈0.37 that is the maximum attainable under symmetrical transmission probability (and thus fairness) for ALOHA. As shown in curves 926 and 1026 of FIGS. 9C and 10C, the fairness of EB-ALL-ALOHA is uniformly very high, since all nodes transmit with the same probability.

Additionally, curves 916 and 1016 of FIGS. 9B and 10B indicate that the bandwidth utilization of ALOHA-Q is dependent on the number of active nodes, increasing as the number of active nodes approaches the frame length of 64. Even when the number of active nodes is 50, as around time block 150 of FIG. 9A, the utilization indicated by curve 916 is below 0.6. This is well below the theoretical maximum of 50/64≈0.78, likely because the active nodes have not had time to adapt to the network conditions. ALOHA-Q also allocates bandwidth fairly, as each node can transmit at most once per frame.

Based on this comparison, the APT-ALOHA algorithm enables nodes sharing a common channel using the slotted ALOHA protocol to quickly approach collision-free transmissions while maintaining fairness. In contrast to prior approaches that use machine learning to improve the performance of slotted ALOHA, the resulting protocol, APT-ALOHA, only requires nodes to agree on the beginning of time slots, and does not require the definition of transmission frames with a fixed number of time slots per frame or the numbering of time slots. Simulation experiments were used to illustrate that APT-ALOHA attains better throughput and fairness than slotted ALOHA with exponential backoffs. and ALOHA-Q, which is framed slotted ALOHA with Q learning.

3. Computational Hardware Overview

Figure 11:
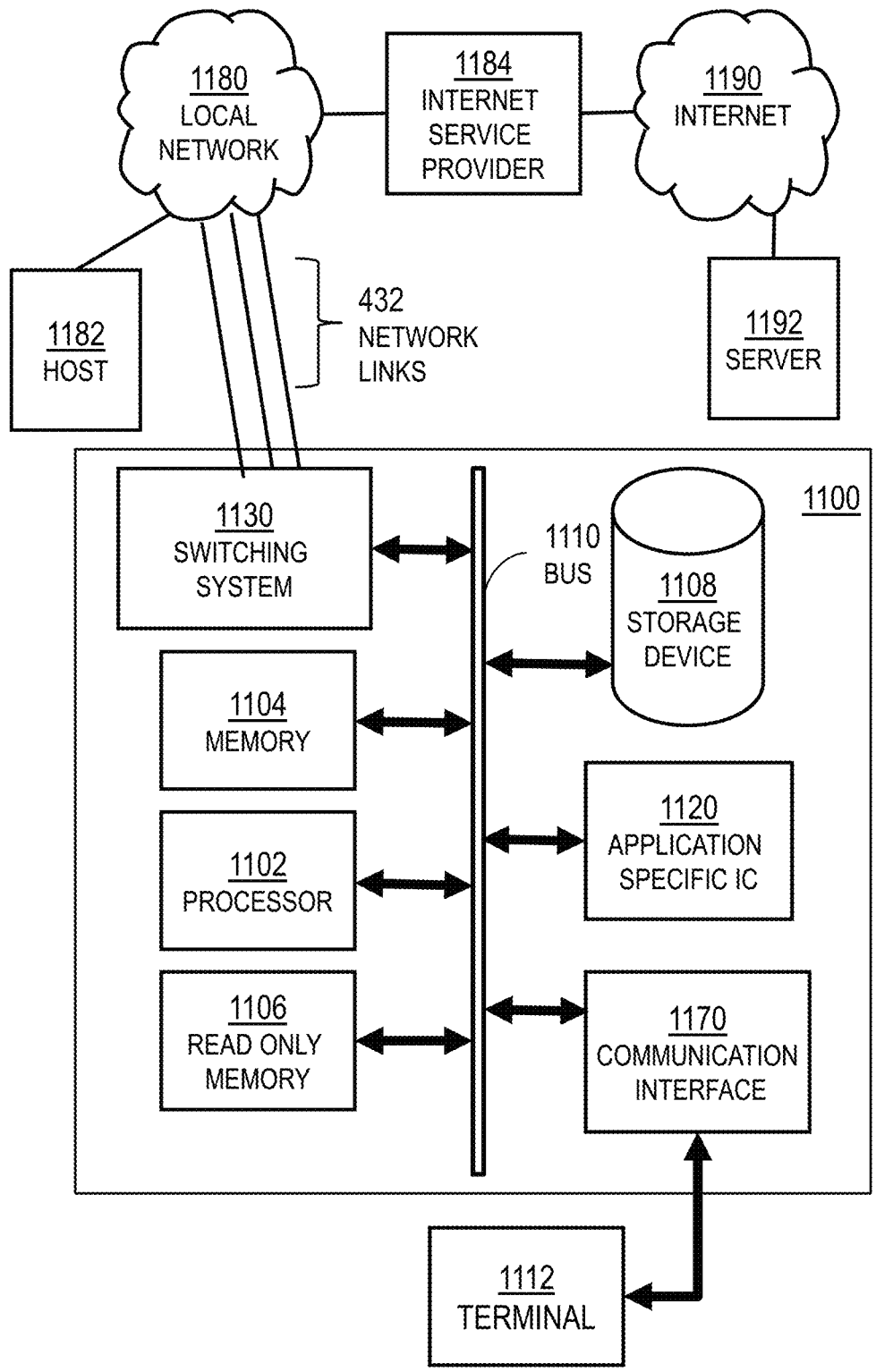
FIG. 11 is a block diagram that illustrates a computer system upon which an embodiment of the invention may be implemented.

FIG. 11 is a block diagram that illustrates a computer system 1100 upon which an embodiment of the invention may be implemented. Computer system 1100 includes a communication mechanism such as a bus 1110 for passing information between other internal and external components of the computer system 1100. Information is represented as physical signals of a measurable phenomenon, typically electric voltages, but including, in other embodiments, such phenomena as magnetic, electromagnetic, pressure, chemical, molecular atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 1100, or a portion thereof, constitutes a means for performing one or more steps of one or more methods described herein.

A sequence of binary digits constitutes digital data that is used to represent a number or code for a character. A bus 1110 includes many parallel conductors of information so that information is transferred quickly among devices coupled to the bus 1110. One or more processors 1102 for processing information are coupled with the bus 1110. A processor 1102 performs a set of operations on information. The set of operations include bringing information in from the bus 1110 and placing information on the bus 1110. The set of operations also typically include comparing two or more units of information, shifting positions of units of information, and combining two or more units of information, such as by addition or multiplication. A sequence of operations to be executed by the processor 1102 constitutes computer instructions.

Computer system 1100 also includes a memory 1104 coupled to bus 1110. The memory 1104, such as a random-access memory (RAM) or other dynamic storage device, stores information including computer instructions. Dynamic memory allows information stored therein to be changed by the computer system 1100. RAM allows a unit of information stored at a location called a memory address to be stored and retrieved independently of information at neighboring addresses. The memory 1104 is also used by the processor 1102 to store temporary values during execution of computer instructions. The computer system 1100 also includes a read only memory (ROM) 1106 or other static storage device coupled to the bus 1110 for storing static information, including instructions, that is not changed by the computer system 1100. Also coupled to bus 1110 is a non-volatile (persistent) storage device 1108, such as a magnetic disk, optical disk, solid-state storage or FLASH-EPROM, for storing information, including instructions, that persists even when the computer system 1100 is turned off or otherwise loses power.

Information, including instructions, is provided to the bus 1110 for use by the processor from an external input device 1112, such as a keyboard containing alphanumeric keys operated by a human user, or a sensor. A sensor detects conditions in its vicinity and transforms those detections into signals compatible with the signals used to represent information in computer system 1100. Other external devices coupled to bus 1110, used primarily for interacting with humans, include a display device 1114, such as a cathode ray tube (CRT) or a liquid crystal display (LCD), for presenting images, and a pointing device 1116, such as a mouse or a trackball or cursor direction keys, for controlling a position of a small cursor image presented on the display 1114 and issuing commands associated with graphical elements presented on the display 1114.

In the illustrated embodiment, special purpose hardware, such as an application specific integrated circuit (IC) 1120, is coupled to bus 1110. The special purpose hardware is configured to perform operations not performed by processor 1102 quickly enough for special purposes. Examples of application specific ICs include graphics accelerator cards for generating images for display 1114, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

In the illustrated computer used as a router, the computer system 1100 includes switching system 1130 as special purpose hardware for switching information flow over a network. Switching system 1130 typically includes multiple communications interfaces, such as communications interface 1170, for coupling to multiple other devices. In general, each coupling is with a network link 1132 that is connected to another device in or attached to a network, such as local network 1180 in the illustrated embodiment, to which a variety of external devices with their own processors are connected. In some embodiments an input interface or an output interface or both are linked to each of one or more external network elements. Although three network links 1132a, 1132b, 1132c are included in network links 1132 in the illustrated embodiment, in other embodiments, more or fewer links are connected to switching system 1130. Network links 1132 typically provides information communication through one or more networks to other devices that use or process the information. For example, network link 1132b may provide a connection through local network 1180 to a host computer 1182 or to equipment 1184 operated by an Internet Service Provider (ISP). ISP equipment 1184 in turn provides data communication services through the public, world-wide packet-switching communication network of networks now commonly referred to as the Internet 1190. A computer called a server 1192 connected to the Internet provides a service in response to information received over the Internet. For example, server 1192 provides routing information for use with switching system 1130.

The switching system 1130 includes logic and circuitry configured to perform switching functions associated with passing information among elements of network 1180, including passing information received along one network link, e.g. 1132a, as output on the same or different network link, e.g., 1132c. The switching system 1130 switches information traffic arriving on an input interface to an output interface according to pre-determined protocols and conventions that are well known. In some embodiments, switching system 1130 includes its own processor and memory to perform some of the switching functions in software. In some embodiments, switching system 1130 relies on processor 1102, memory 1104, ROM 1106, storage 1108, or some combination, to perform one or more switching functions in software. For example, switching system 1130, in cooperation with processor 1104 implementing a particular protocol, can determine a destination of a packet of data arriving on input interface on link 1132a and send it to the correct destination using output interface on link 1132c. The destinations may include host 1182, server 1192, other terminal devices connected to local network 1180 or Internet 1190, or other routing and switching devices in local network 1180 or Internet 1190.

Computer system 1100 also includes one or more instances of a communications interface 1170 coupled to bus 1110. Communication interface 1170 provides a two-way communication coupling to a variety of external devices that operate with their own processors, such as printers, scanners and external disks. In general, the coupling is with a network link 1132 that is connected to a local network 1180 to which a variety of external devices with their own processors are connected. For example, communication interface 1170 may be a parallel port or a serial port or a universal serial bus (USB) port on a personal computer. In some embodiments, communications interface 1170 is an integrated services digital network (ISDN) card or a digital subscriber line (DSL) card or a telephone modem that provides an information communication connection to a corresponding type of telephone line. In some embodiments, a communication interface 1170 is a cable modem that converts signals on bus 1110 into signals for a communication connection over a coaxial cable or into optical signals for a communication connection over a fiber optic cable. As another example, communications interface 1170 may be a local area network (LAN) card to provide a data communication connection to a compatible LAN, such as Ethernet. As another example, communications interface 1170 may be a modulator-demodulator (modem) to provide a wireless link to other devices capable of receiving information wirelessly. Carrier waves, such as acoustic waves and electromagnetic waves, including radio, optical and infrared waves travel through space without wires or cables. Signals include man-made variations in amplitude, frequency, phase, polarization or other physical properties of carrier waves. For wireless links, the communications interface 1170 sends and receives electrical, acoustic or electromagnetic signals, including infrared and optical signals, that carry information streams, such as digital data.

The term computer-readable medium is used herein to refer to any medium that participates in providing information to processor 1102, including instructions for execution. Such a medium may take many forms, including, but not limited to, non-volatile media, volatile media and transmission media. Non-volatile media include, for example, optical or magnetic disks, such as storage device 1108. Volatile media include, for example, dynamic memory 1104. Transmission media include, for example, coaxial cables, copper wire, fiber optic cables, and waves that travel through space without wires or cables, such as acoustic waves and electromagnetic waves, including radio, optical and infrared waves. The term computer-readable storage medium is used herein to refer to any medium that participates in providing information to processor 1102, except for transmission media.

Common forms of computer-readable media include, for example, a floppy disk, a flexible disk, a hard disk, a magnetic tape, or any other magnetic medium, a compact disk ROM (CD-ROM), a digital video disk (DVD) or any other optical medium, punch cards, paper tape, or any other physical medium with patterns of holes, a RAM, a programmable ROM (PROM), an erasable PROM (EPROM), a FLASH-EPROM, or any other memory chip or cartridge, a carrier wave, or any other medium from which a computer can read. The term non-transitory computer-readable storage medium is used herein to refer to any medium that participates in providing information to processor 1102, except for carrier waves and other signals.

Logic encoded in one or more tangible media includes one or both of processor instructions on a computer-readable storage media and special purpose hardware, such as ASIC 1120.

The invention is related to the use of computer system 1100 for implementing the techniques described herein. According to one embodiment of the invention, those techniques are performed by computer system 1100 in response to processor 1102 executing one or more sequences of one or more instructions contained in memory 1104. Such instructions, also called software and program code, may be read into memory 1104 from another computer-readable medium such as storage device 1108. Execution of the sequences of instructions contained in memory 1104 causes processor 1102 to perform the method steps described herein. In alternative embodiments, hardware, such as application specific integrated circuit 1120, may be used in place of or in combination with software to implement the invention. Thus, embodiments of the invention are not limited to any specific combination of hardware and software.

The signals transmitted over network link 1132 and other networks through communications interface 1170, carry information to and from computer system 1100. Computer system 1100 can send and receive information, including program code, through the networks 1180, 1190 among others, through network link 1132 and communications interface 1170. In an example using the Internet 1190, a server 1192 transmits program code for a particular application, requested by a message sent from computer 1100, through Internet 1190, ISP equipment 1184, local network 1180 and communications interface 1170. The received code may be executed by processor 1102 as it is received, or may be stored in storage device 1108 or other non-volatile storage for later execution, or both. In this manner, computer system 1100 may obtain application program code in the form of a signal on a carrier wave.

Various forms of computer readable media may be involved in carrying one or more sequence of instructions or data or both to processor 1102 for execution. For example, instructions and data may initially be carried on a magnetic disk of a remote computer such as host 1182. The remote computer loads the instructions and data into its dynamic memory and sends the instructions and data over a telephone line using a modem. A modem local to the computer system 1100 receives the instructions and data on a telephone line and uses an infrared transmitter to convert the instructions and data to a signal on an infra-red a carrier wave serving as the network link 1132. An infrared detector serving as communications interface 1170 receives the instructions and data carried in the infrared signal and places information representing the instructions and data onto bus 1110. Bus 1110 carries the information to memory 1104 from which processor 1102 retrieves and executes the instructions using some of the data sent with the instructions. The instructions and data received in memory 1104 may optionally be stored on storage device 1108, either before or after execution by the processor 1102.

Figure 12:
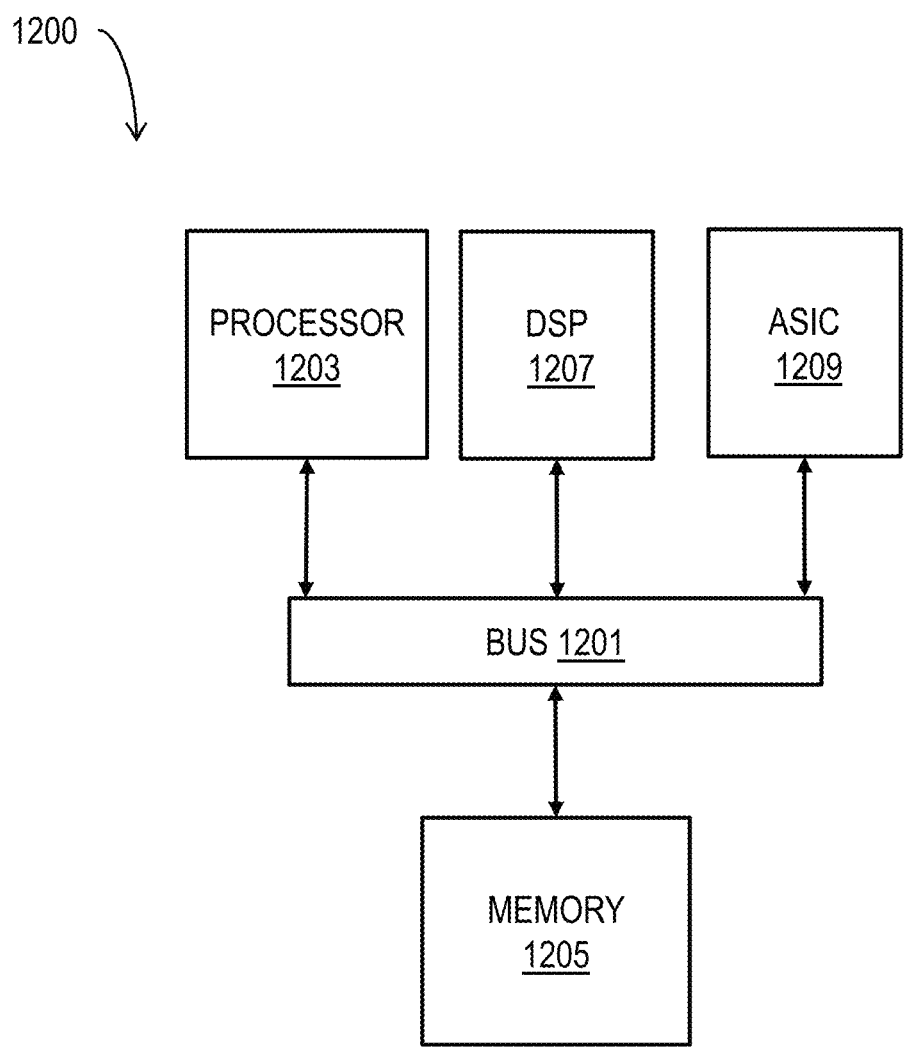
FIG. 12 illustrates a chip set upon which an embodiment of the invention may be implemented.

FIG. 12 illustrates a chip set 1200 upon which an embodiment of the invention may be implemented. Chip set 1200 is programmed to perform one or more steps of a method described herein and includes, for instance, the processor and memory components described with respect to FIG. 10 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 1200, or a portion thereof, constitutes a means for performing one or more steps of a method described herein.

In one embodiment, the chip set 1200 includes a communication mechanism such as a bus 1201 for passing information among the components of the chip set 1200. A processor 1203 has connectivity to the bus 1201 to execute instructions and process information stored in, for example, a memory 1205. The processor 1203 may include one or more processing cores with each core configured to perform independently. A multi-core processor enables multiprocessing within a single physical package. Examples of a multi-core processor include two, four, eight, or greater numbers of processing cores. Alternatively, or in addition, the processor 1203 may include one or more microprocessors configured in tandem via the bus 1201 to enable independent execution of instructions, pipelining, and multithreading. The processor 1203 may also be accompanied with one or more specialized components to perform certain processing functions and tasks such as one or more digital signal processors (DSP) 1207, or one or more application-specific integrated circuits (ASIC) 1209. A DSP 1207 typically is configured to process real-world signals (e.g., sound) in real time independently of the processor 1203. Similarly, an ASIC 1209 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1203 and accompanying components have connectivity to the memory 1205 via the bus 1201. The memory 1205 includes both dynamic memory (e.g., RAM, magnetic disk, writable optical disk, etc.) and static memory (e.g., ROM, CD-ROM, etc.) for storing executable instructions that when executed perform one or more steps of a method described herein. The memory 1205 also stores the data associated with or generated by the execution of one or more steps of the methods described herein.

Figure 13:
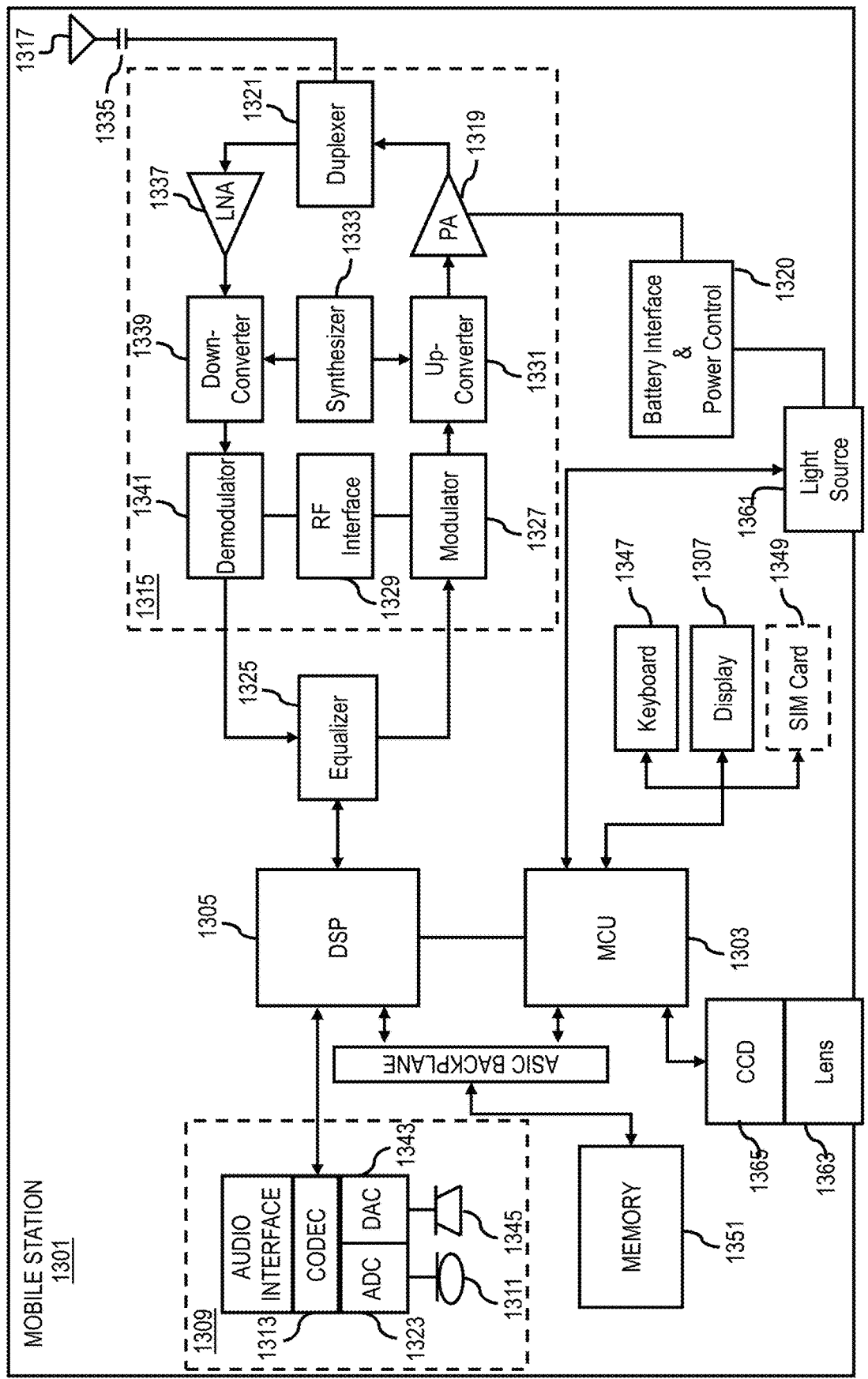
FIG. 13 is a diagram of exemplary components of a mobile terminal (e.g., cell phone handset) for communications, which is capable of operating in the system of FIG. 1, according to one embodiment.

FIG. 13 is a diagram of exemplary components of a mobile terminal 1300 (e.g., cell phone handset) for communications, which is capable of operating in the system of FIG. 2C, according to one embodiment. In some embodiments, mobile terminal 1301, or a portion thereof, constitutes a means for performing one or more steps described herein. Generally, a radio receiver is often defined in terms of front-end and back-end characteristics. The front-end of the receiver encompasses all of the Radio Frequency (RF) circuitry whereas the back-end encompasses all of the base-band processing circuitry. As used in this application, the term "circuitry" refers to both: (1) hardware-only implementations (such as implementations in only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 1303, a Digital Signal Processor (DSP) 1305, and a receiver/transmitter unit including a microphone gain control unit and a speaker gain control unit. A main display unit 1307 provides a display to the user in support of various applications and mobile terminal functions that perform or support the steps as described herein. The display 1307 includes display circuitry configured to display at least a portion of a user interface of the mobile terminal (e.g., mobile telephone). Additionally, the display 1307 and display circuitry are configured to facilitate user control of at least some functions of the mobile terminal. An audio function circuitry 1309 includes a microphone 1311 and microphone amplifier that amplifies the speech signal output from the microphone 1311. The amplified speech signal output from the microphone 1311 is fed to a coder/decoder (CODEC) 1313.

A radio section 1315 amplifies power and converts frequency in order to communicate with a base station, which is included in a mobile communication system, via antenna 1317. The power amplifier (PA) 1319 and the transmitter/modulation circuitry are operationally responsive to the MCU 1303, with an output from the PA 1319 coupled to the duplexer 1321 or circulator or antenna switch, as known in the art. The PA 1319 also couples to a battery interface and power control unit 1320.

In use, a user of mobile terminal 1301 speaks into the microphone 1311 and his or her voice along with any detected background noise is converted into an analog voltage. The analog voltage is then converted into a digital signal through the Analog to Digital Converter (ADC) 1323. The control unit 1303 routes the digital signal into the DSP 1305 for processing therein, such as speech encoding, channel encoding, encrypting, and interleaving. In one embodiment, the processed voice signals are encoded, by units not separately shown, using a cellular transmission protocol such as enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like, or any combination thereof.

The encoded signals are then routed to an equalizer 1325 for compensation of any frequency-dependent impairments that occur during transmission though the air such as phase and amplitude distortion. After equalizing the bit stream, the modulator 1327 combines the signal with a RF signal generated in the RF interface 1329. The modulator 1327 generates a sine wave by way of frequency or phase modulation. In order to prepare the signal for transmission, an up-converter 1331 combines the sine wave output from the modulator 1327 with another sine wave generated by a synthesizer 1333 to achieve the desired frequency of transmission. The signal is then sent through a PA 1319 to increase the signal to an appropriate power level. In practical systems, the PA 1319 acts as a variable gain amplifier whose gain is controlled by the DSP 1305 from information received from a network base station. The signal is then filtered within the duplexer 1321 and optionally sent to an antenna coupler 1335 to match impedances to provide maximum power transfer. Finally, the signal is transmitted via antenna 1317 to a local base station. An automatic gain control (AGC) can be supplied to control the gain of the final stages of the receiver. The signals may be forwarded from there to a remote telephone which may be another cellular telephone, any other mobile phone or a land-line connected to a Public Switched Telephone Network (PSTN), or other telephony networks.

Voice signals transmitted to the mobile terminal 1301 are received via antenna 1317 and immediately amplified by a low noise amplifier (LNA) 1337. A down-converter 1339 lowers the carrier frequency while the demodulator 1341 strips away the RF leaving only a digital bit stream. The signal then goes through the equalizer 1325 and is processed by the DSP 1305. A Digital to Analog Converter (DAC) 1343 converts the signal and the resulting output is transmitted to the user through the speaker 1345, all under control of a Main Control Unit (MCU) 1303 which can be implemented as a Central Processing Unit (CPU) (not shown).

The MCU 1303 receives various signals including input signals from the keyboard 1347. The keyboard 1347 and/or the MCU 1303 in combination with other user input components (e.g., the microphone 1311) comprise a user interface circuitry for managing user input. The MCU 1303 runs a user interface software to facilitate user control of at least some functions of the mobile terminal 1301 as described herein. The MCU 1303 also delivers a display command and a switch command to the display 1307 and to the speech output switching controller, respectively. Further, the MCU 1303 exchanges information with the DSP 1305 and can access an optionally incorporated SIM card 1349 and a memory 1351. In addition, the MCU 1303 executes various control functions required of the terminal. The DSP 1305 may, depending upon the implementation, perform any of a variety of conventional digital processing functions on the voice signals. Additionally, DSP 1305 determines the background noise level of the local environment from the signals detected by microphone 1311 and sets the gain of microphone 1311 to a level selected to compensate for the natural tendency of the user of the mobile terminal 1301.

The CODEC 1313 includes the ADC 1323 and DAC 1343. The memory 1351 stores various data including call incoming tone data and is capable of storing other data including music data received via, e.g., the global Internet. The software module could reside in RAM memory, flash memory, registers, or any other form of writable storage medium known in the art. The memory device 1351 may be, but not limited to, a single memory, CD, DVD, ROM, RAM, EEPROM, optical storage, magnetic disk storage, flash memory storage, or any other non-volatile storage medium capable of storing digital data.

An optionally incorporated SIM card 1349 carries, for instance, important information, such as the cellular phone number, the carrier supplying service, subscription details, and security information. The SIM card 1349 serves primarily to identify the mobile terminal 1301 on a radio network.

The card 1349 also contains a memory for storing a personal telephone number registry, text messages, and user specific mobile terminal settings.

In some embodiments, the mobile terminal 1301 includes a digital camera comprising an array of optical detectors, such as charge coupled device (CCD) array 1365. The output of the array is image data that is transferred to the MCU for further processing or storage in the memory 1351 or both. In the illustrated embodiment, the light impinges on the optical array through a lens 1363, such as a pin-hole lens or a material lens made of an optical grade glass or plastic material. In the illustrated embodiment, the mobile terminal 1301 includes a light source 1361, such as a LED to illuminate a subject for capture by the optical array, e.g., CCD 1365. The light source is powered by the battery interface and power control module 1320 and controlled by the MCU 1303 based on instructions stored or loaded into the MCU 1303.

4. Alternatives, Extensions and Modifications

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense. Throughout this specification and the claims, unless the context requires otherwise, the word "comprise" and its variations, such as "comprises" and "comprising," will be understood to imply the inclusion of a stated item, element or step or group of items, elements or steps but not the exclusion of any other item, element or step or group of items, elements or steps. Furthermore, the indefinite article "a" or "an" is meant to indicate one or more of the item, element or step modified by the article. As used herein, unless otherwise clear from the context, a value is "about" another value if it is within a factor of two (twice or half) of the other value. While example ranges are given, unless otherwise clear from the context, any contained ranges are also intended in various embodiments. Thus, a range from 0 to 10 includes the range 1 to 4 in some embodiments.

5. References

Each of the following references is hereby incorporated by reference as if fully set forth herein, except for terminology that is inconsistent with that sued herein.

What is claimed is:

1. A method implemented on a processor for transmitting data packets on a shared channel in a data communications network, the method comprising:
   retrieving from storage a plurality of policies for sharing a shared channel among nodes in a data communications network using a particular protocol, the plurality of polices defining a tree of periodic schedules of variable periods, each policy defining a transmit time slot as a unique slot i of a modulus of a power m of a base b of a series of time slots, where m indicates a level of the tree of periodic schedules;
   observing at a first node the probability of empty time slots or of successful time slots or of collision time slots on the shared channel, or some combination of two probabilities;
   selecting at the first node in the data communications network a first policy among the plurality of policies based on the probability or probabilities observed instead of a message received from a central authority; and transmitting a local data packet from the first node onto the shared channel at a transmit time based on the first policy.

2. The method as recited in claim 1, further comprising determining whether the local data packet is not successfully transmitted;

when the local data packet is not successfully transmitted selecting at the first node a different second policy among the plurality of policies, wherein the second policy has a periodic schedule at higher level m of the tree of periodic schedules; and transmitting the local data packet from the first node onto the shared channel at a transmit time slot based on the second policy.

3. The method as recited in claim 1, further comprising determining whether the local data packet is successfully transmitted;

when the local data packet is successfully transmitted, adding at the first node, with a barge-in probability based on at least one of the observed probabilities, a different second policy among the plurality of policies, wherein the second policy has a periodic schedule at higher level m of the tree of periodic schedules; and transmitting a subsequent different local data packet from the first node onto the shared channel at a transmit time slot based on the first policy or the second policy.

4. The method as recited in claim 3, wherein a periodic schedule of the second policy is not a descendant of a periodic schedule of the first policy in the tree of periodic schedules.

5. The method as recited in claim 1, further comprising determining whether the local data packet is successfully transmitted;

when the local data packet is successfully transmitted, selecting at the first node, with a kindness probability based on at least one of the observed probabilities, a different second policy among the plurality of policies, wherein the second policy has a periodic schedule at higher level m of the tree of periodic schedules; and transmitting a subsequent different local data packet from the first node onto the shared channel at a transmit time slot based on the second policy.

6. The method as recited in claim 5, wherein a periodic schedule of the second policy is a descendant of a periodic schedule of the first policy in the tree of periodic schedules.

7. The method as recited in claim 1, wherein the base b of the modulus is 2.

8. A non-transitory computer-readable medium carrying one or more sequences of instructions, wherein execution of the one or more sequences of instructions by one or more processors causes the one or more processors to perform the steps of:

retrieving from storage a plurality of policies for sharing a shared channel among nodes in a data communications network using a particular protocol, the plurality of polices defining a tree of periodic schedules of variable periods, each policy defining a transmit time slot as a unique slot i of a modulus of a power m of a base b of a series of time slots, where m indicates a level of the tree of periodic schedules;

observing at a first node the probability of empty time slots or of successful time slots or of collision time slots on the shared channel, or some combination of two probabilities;

selecting at the first node in the data communications network a first policy among the plurality of policies based on the probability or probabilities observed instead of a message received from a central authority; and transmitting a local data packet from the first node onto the shared channel at a transmit time based on the first policy.

9. The non-transitory computer-readable medium as recited in claim 8, wherein execution of the one or more sequences of instructions by one or more processors further causes the one or more processors to perform the steps of:

determining whether the local data packet is not successfully transmitted;

when the local data packet is not successfully transmitted selecting at the first node a different second policy among the plurality of policies, wherein the second policy has a periodic schedule at higher level m of the tree of periodic schedules; and transmitting the local data packet from the first node onto the shared channel at a transmit time slot based on the second policy.

10. The non-transitory computer-readable medium as recited in claim 8, wherein execution of the one or more sequences of instructions by one or more processors further causes the one or more processors to perform the steps of:

determining whether the local data packet is successfully transmitted;

when the local data packet is successfully transmitted, adding at the first node, with a barge-in probability based on at least one of the observed probabilities, a different second policy among the plurality of policies, wherein the second policy has a periodic schedule at higher level m of the tree of periodic schedules; and transmitting a subsequent different local data packet from the first node onto the shared channel at a transmit time slot based on the first policy or the second policy.

11. The non-transitory computer-readable medium as recited in claim 10, wherein a periodic schedule of the second policy is not a descendant of a periodic schedule of the first policy in the tree of periodic schedules.

12. The non-transitory computer-readable medium as recited in claim 8, wherein execution of the one or more sequences of instructions by one or more processors further causes the one or more processors to perform the steps of:

determining whether the local data packet is successfully transmitted;

when the local data packet is successfully transmitted, selecting at the first node, with a kindness probability based on at least one of the observed probabilities, a different second policy among the plurality of policies, wherein the second policy has a periodic schedule at higher level m of the tree of periodic schedules; and transmitting a subsequent different local data packet from the first node onto the shared channel at a transmit time slot based on the second policy.

13. The non-transitory computer-readable medium as recited in claim 12, wherein a periodic schedule of the second policy is a descendant of a periodic schedule of the first policy in the tree of periodic schedules.

14. The non-transitory computer-readable medium as recited in claim 8, wherein the base b of the modulus is 2.

15. An apparatus comprising:
at least one processor;
a network connection; and
at least one memory including one or more sequences of instructions, the at least one memory and the one or more sequences of instructions configured to, with the
at least one processor, cause the apparatus to perform at least the following,
retrieving from storage a plurality of policies for sharing a shared channel among nodes in a data communications network using a particular protocol, the plurality of polices defining a tree of periodic schedules of variable periods, each policy defining a transmit time slot as a unique slot i of a modulus of a power m of a base b of a series of time slots, where m indicates a level of the tree of periodic schedules;
observing at a first node the probability of empty time slots or of successful time slots or of collision time slots on the shared channel, or some combination of two probabilities;
selecting at the first node in the data communications network a first policy among the plurality of policies based on the probability or probabilities observed instead of a message received from a central authority; and
transmitting a local data packet from the first node onto the shared channel at a transmit time based on the first policy.

16. The apparatus as recited in claim 15, wherein the memory and the one or more sequences of instructions is configured to, with the processor, cause the apparatus to further perform the following,
determining whether the local data packet is not successfully transmitted;
when the local data packet is not successfully transmitted selecting at the first node a different second policy among the plurality of policies, wherein the second policy has a periodic schedule at higher level m of the tree of periodic schedules; and
transmitting the local data packet from the first node onto the shared channel at a transmit time slot based on the second policy.

17. The apparatus as recited in claim 15, wherein the memory and the one or more sequences of instructions is configured to, with the processor, cause the apparatus to further perform the following,
determining whether the local data packet is successfully transmitted;
when the local data packet is successfully transmitted, adding at the first node, with a barge-in probability based on at least one of the observed probabilities, a different second policy among the plurality of policies, wherein the second policy has a periodic schedule at higher level m of the tree of periodic schedules; and
transmitting a subsequent different local data packet from the first node onto the shared channel at a transmit time slot based on the first policy or the second policy.

18. The apparatus as recited in claim 15, wherein the memory and the one or more sequences of instructions is configured to, with the processor, cause the apparatus to further perform the following,
determining whether the local data packet is successfully transmitted;
when the local data packet is successfully transmitted, selecting at the first node, with a kindness probability based on at least one of the observed probabilities, a different second policy among the plurality of policies, wherein the second policy has a periodic schedule at higher level m of the tree of periodic schedules; and
transmitting a subsequent different local data packet from the first node onto the shared channel at a transmit time slot based on the second policy.

19. The apparatus as recited in claim 18, wherein a periodic schedule of the second policy is a descendant of a periodic schedule of the first policy in the tree of periodic schedules.

20. The apparatus as recited in claim 15, wherein the base b of the modulus is 2.

* * * * *